United States Patent
Okayasu et al.

(10) Patent No.: US 6,568,943 B2
(45) Date of Patent: May 27, 2003

(54) ELECTRIC CONNECTION DEVICE, BATTERY HAVING ELECTRIC CONNECTION DEVICE, AND ELECTRONIC EQUIPMENT HAVING BATTERY

(75) Inventors: Yoshisada Okayasu, Tokyo (JP); Kiyoshi Tomura, Chiba (JP); Shun Kayama, Saitama (JP); Naoyuki Ono, Kanagawa (JP)

(73) Assignees: Sony Corporation, Tokyo (JP); SMK Corporation, Tokyo (JP)

( * ) Notice: Subject to any disclaimer, the term of this patent is extended or adjusted under 35 U.S.C. 154(b) by 0 days.

(21) Appl. No.: 09/982,432

(22) Filed: Oct. 18, 2001

(65) Prior Publication Data

US 2002/0045377 A1 Apr. 18, 2002

(30) Foreign Application Priority Data

Oct. 18, 2000 (JP) ........................................ 2000-317963

(51) Int. Cl.$^7$ ................................................ H01R 4/58
(52) U.S. Cl. ...................................... 439/76.1; 439/636
(58) Field of Search ........................... 439/76.1, 31, 13, 439/65, 62, 629, 636, 79, 59, 67, 84, 631, 630–632, 638

(56) References Cited

U.S. PATENT DOCUMENTS

| | | | | |
|---|---|---|---|---|
| 4,075,759 A | * | 2/1978 | Sochor | 439/629 |
| 4,632,475 A | * | 12/1986 | Tomita | 439/31 |
| 4,877,409 A | * | 10/1989 | Tanigawa et al. | 439/31 |
| 6,033,264 A | * | 3/2000 | Feye-Hohmann | 439/631 |
| 6,250,966 B1 | * | 6/2001 | Hashimoto et al. | 439/631 |

FOREIGN PATENT DOCUMENTS

| | | |
|---|---|---|
| DE | 19934119 | 4/2000 |
| EP | 0939457 | 9/1999 |
| FR | 2693340 | 1/1994 |
| JP | 11-86928 | 3/1999 |

* cited by examiner

Primary Examiner—P. Austin Bradley
Assistant Examiner—Ross Gushi
(74) Attorney, Agent, or Firm—Sonnenschein, Nath & Rosenthal

(57) ABSTRACT

A connection device for electrically connecting a contact 304 of an equipment with a board 36 in a battery 100, the device comprising a housing 41 having an aperture 40H, and a connection terminal 300 arranged within the housing 41 correspondingly to the aperture 40H, the connection terminal having a plurality of first connecting parts 302 for pinching and holding the contact 304 of the equipment so as to be electrically connected with the contact 304 of the equipment and a plurality of second connecting parts 303 provided integrally with the plurality of first connecting parts 302 for pinching the board 36 to electrically connect the plurality of first connecting parts 302 with the contact 304 of the equipment.

13 Claims, 25 Drawing Sheets

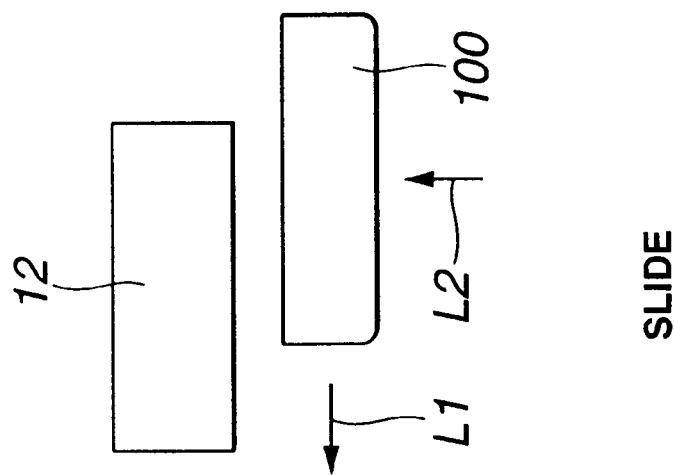
FIG.21C SLIDE
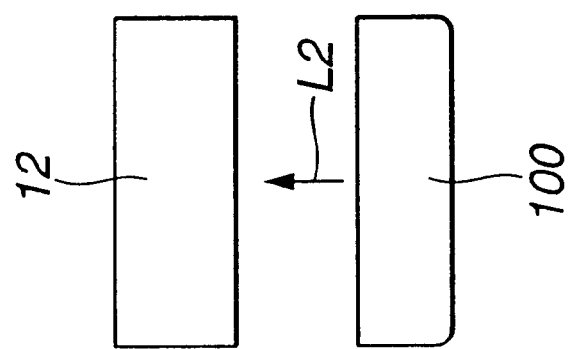
FIG.21B UP AND DOWN
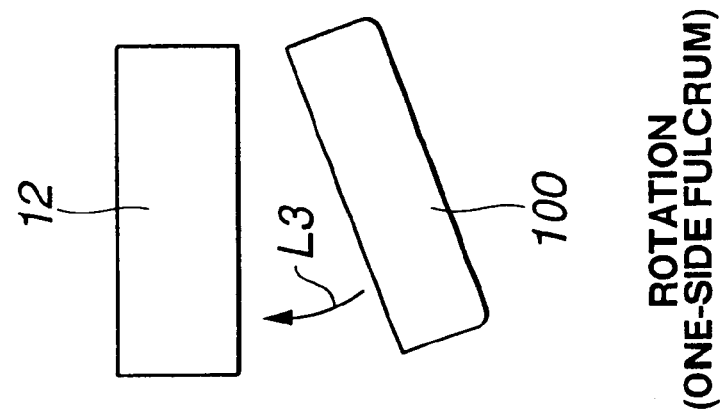
FIG.21A ROTATION (ONE-SIDE FULCRUM)

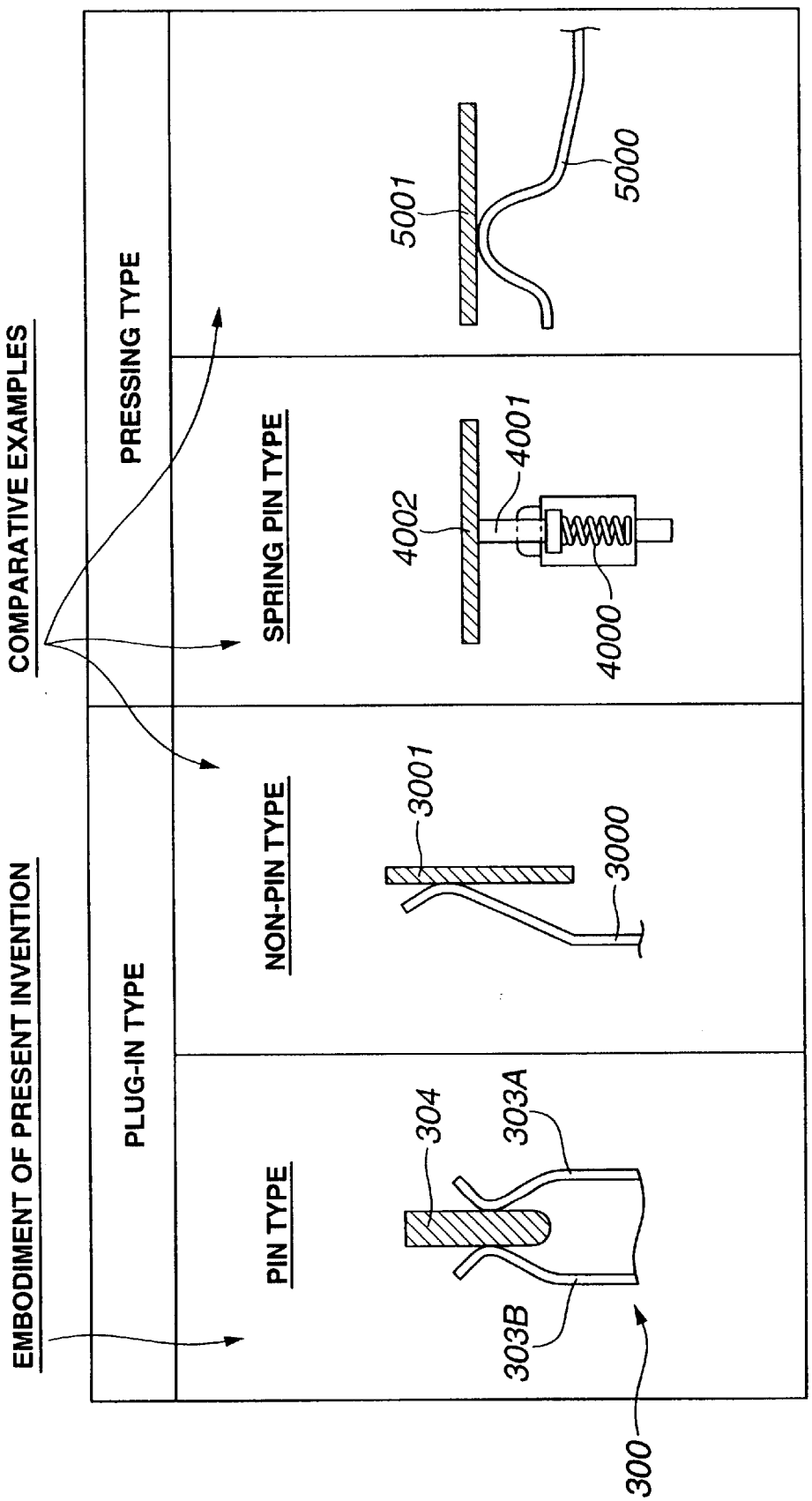

ELECTRIC CONNECTION DEVICE, BATTERY HAVING ELECTRIC CONNECTION DEVICE, AND ELECTRONIC EQUIPMENT HAVING BATTERY

BACKGROUND OF THE INVENTION

1. Field of the Invention

This invention relates to an electric connection device for electrically connecting a plate-like contact of an equipment to a board, a battery having an electric connection device, and an electronic equipment having such a battery.

2. Description of the Related Art

An electronic equipment, for example, a portable telephone has a battery removably attached to its back side. The battery can be charged from outside by supplying the power while the battery is mounted on the battery body.

FIG. 1 shows an exemplary structure of a conventional battery. The conventional battery 1000 has an upper case 1001, a lower case 1002, a battery body 1003 and the like. After electrode lead-out parts 1004 and 1005 of the battery body 1003 are resistance-welded to tabs 1006 as shown in FIGS. 1 and 2, these tabs 1006 are soldered to a board 1007.

Then, an external connecting part 1008 is electrically connected with the board 1007 by manual soldering by an operator.

Therefore, the difficulty in miniaturization of the battery 1000 and the heat transfer to a sealing part of the battery at the time of welding cause lowering of reliability.

Moreover, since the external connecting part 1008 is manually soldered to the board 1007 by the operator, the difficulty in automation of soldering and the increase in the number of assembling processes obstruct reduction in cost.

Furthermore, it is necessary to realize secure and easy electric connection of the board of the battery, for example, with the contact of the casing of a portable telephone.

SUMMARY OF THE INVENTION

Thus, in view of the foregoing status of the art, it is an object of the present invention to provide an electric connection device which enables miniaturization and reduction in thickness, realization of high electrical reliability and reduction in cost, a battery having an electric connection device, and an electronic equipment having such a battery.

According to the present invention, there is provided an electric connection device for electrically connecting a contact of an equipment with a board within a battery, the device comprising: a housing having an aperture; and a connection terminal arranged within the housing correspondingly to the aperture, the connection terminal having a plurality of first connecting parts for pinching and holding the contact of the equipment so as to be electrically connected with the contact of the equipment and a plurality of second connecting parts provided integrally with the plurality of first connecting parts for pinching the board to electrically connect the plurality of first connecting parts with the contact of the equipment.

The housing of the electric connection device has the aperture. The connection terminal of the electric connection device is arranged within the housing correspondingly to the aperture. The first connecting parts of the connection terminal pinch and hold the contact of the equipment so as to be electrically connected with the contact of the equipment. The second connecting parts are provided integrally with the first connecting parts, and pinch the board to electrically connect the first connecting parts with the contact of the equipment.

Thus, the connection terminal can securely and easily realize connection while electrically and mechanically pinching the board. Since the housing and the connection terminal are integrally constituted, miniaturization and reduction in thickness of the electric connection device can be realized and the reliability of electric connection can be improved at a lower cost.

Also, in the electric connection device according to the present invention, a plurality of said connection terminals are arrayed at a spacing from one another within the housing and the housing is guided by a guide pin of the contact, thereby electrically connecting the first connecting parts of the connection terminals with the contact.

In this case, a plurality of connection terminals are arrayed at a spacing from one another within the housing. As the housing is guided by the guide pin of the contact, the first connecting parts of the connection terminals can be securely electrically connected with the contact.

Moreover, in the electric connection device according to the present invention, the aperture of the housing is formed in association with two sides of the housing.

In this case, the housing aperture is formed in associated with the two sides of the housing. Therefore, the contact can be pinched and held by the plurality of first connecting parts through the apertures on the two sides of the housing. Thus, the connectivity in connecting the electric connection device within the contact of the equipment can be improved.

According to the present invention, there is also provided a battery having an electric connection device for electrically connecting with a contact of an electronic equipment and supplying a power source to the electronic equipment, the battery comprising: a case; a battery body arranged within the case; a board arranged within the case for electrically connecting an electrode lead-out part of the battery body; and an electric connecting part exposed from the case for electrically connecting the electrode lead-out part with the electronic equipment via the board. The electric connecting part comprises a housing having an aperture, and a connection terminal arranged within the housing correspondingly to the aperture, the connection terminal having a plurality of first connecting parts for pinching and holding the contact of the electronic equipment so as to be electrically connected with the contact of the equipment and a plurality of second connecting parts provided integrally with the plurality of first connecting parts for pinching the board to electrically connect the plurality of first connecting parts with the contact of the equipment.

The battery according to the present invention has the case, the battery body, the board, and the electric connecting part.

Thus, the connection terminal can securely and easily realize connection while electrically and mechanically pinching the board. Since the housing and the connection terminal are integrally constituted, miniaturization and reduction in thickness of the electric connection device can be realized and the reliability of electric connection can be improved at a lower cost.

Also, in the battery having an electric connection device according to the present invention, a plurality of said connection terminals are arrayed at a spacing from one another within the housing and the housing is guided by a guide pin of the contact, thereby electrically connecting the first connecting parts of the connection terminals with the contact.

In this case, a plurality of connection terminals are arrayed at a spacing from one another within the housing. As the housing is guided by the guide pin of the contact, the first connecting parts of the connection terminals can be securely electrically connected with the contact.

Moreover, in the battery having an electric connection device according to the present invention, the aperture of the housing is formed in association with two sides of the housing.

In this case, the housing aperture is formed in associated with the two sides of the housing. Therefore, the contact can be pinched and held by the plurality of first connecting parts through the apertures on the two sides of the housing. Thus, the connectivity in connecting the electric connection device within the contact of the equipment can be improved.

In the battery having an electric connection device according to the present invention, the board is held and fixed by the case of the battery.

In this case, the board can be easily fixed as it is held and fixed by the case of the battery.

According to the present invention, there is also provided an electronic equipment having a battery for electrically connecting and supplying a power source to a contact of the electronic equipment. The battery comprises a case, a battery body arranged within the case, a board arranged within the case for electrically connecting an electrode lead-out part of the battery body, and an electric connecting part exposed from the case for electrically connecting the electrode lead-out part with the electronic equipment via the board. The electric connecting part comprises a housing having an aperture, and a connection terminal arranged within the housing correspondingly to the aperture, the connection terminal having a plurality of first connecting parts for pinching and holding the contact of the electronic equipment so as to be electrically connected with the contact of the equipment and a plurality of second connecting parts provided integrally with the plurality of first connecting parts for pinching the board to electrically connect the plurality of first connecting parts with the contact of the equipment.

In the electronic equipment according to the present invention, the battery has the case, the battery body, the board, and the electric connecting part.

Thus, the connection terminal can securely and easily realize connection while electrically and mechanically pinching the board. Since the housing and the connection terminal are integrally constituted, miniaturization and reduction in thickness of the electric connection device can be realized and the reliability of electric connection can be improved at a lower cost.

BRIEF DESCRIPTION OF THE DRAWINGS

FIGS. 21A to 21C show exemplary directions of attachment/detachment of the battery to/from the casing.

FIGS. 22A to 22D comparatively show an example of the electric connection structure according to an embodiment of the present invention and other examples of conventional structure.

DESCRIPTION OF THE PREFERRED EMBODIMENTS

Preferred embodiments of the present invention will now be described in detail with reference to the attached drawings.

Since the following embodiments are preferred specific example of the present invention, various limitations which are technically preferred are provided. However, the scope of the present invention is not limited to these embodiments unless there is any particular description to limit the present invention.

Figure 3:
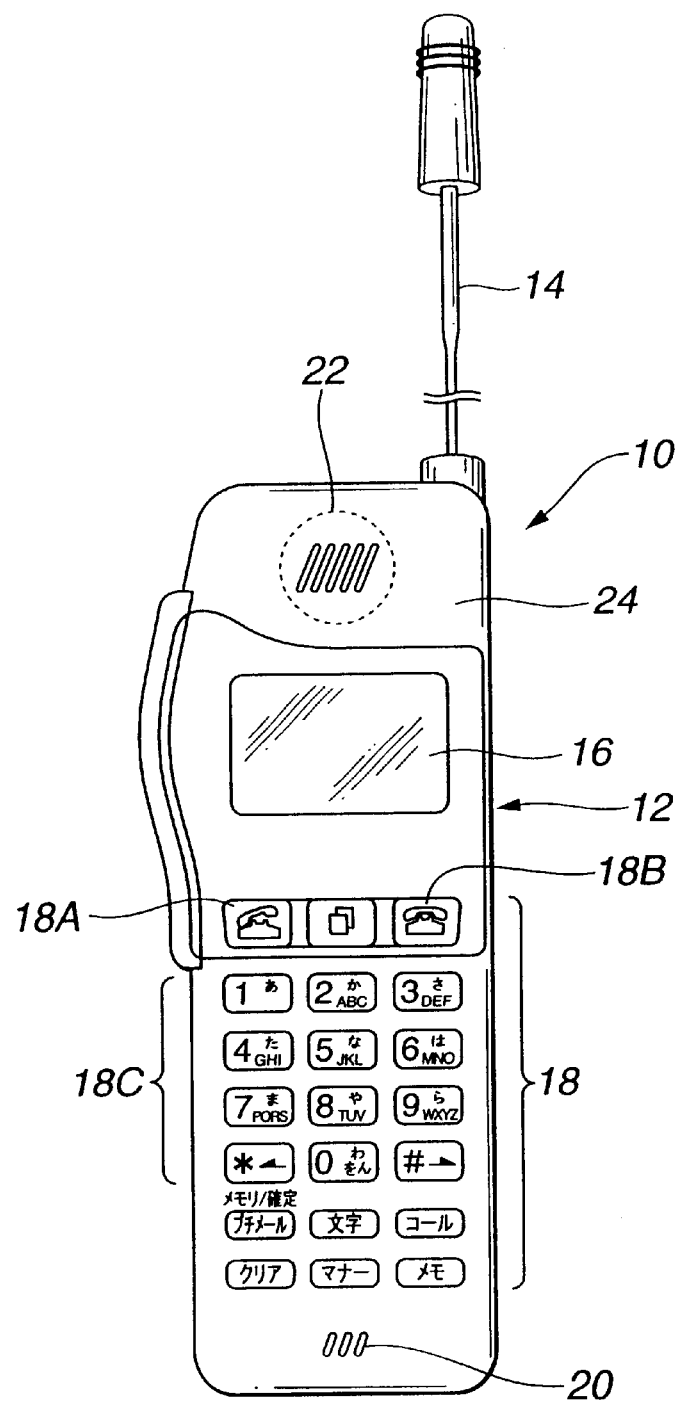
FIG. 3 is a front view showing a portable telephone as an example of an electronic equipment of the present invention.
Figure 4:
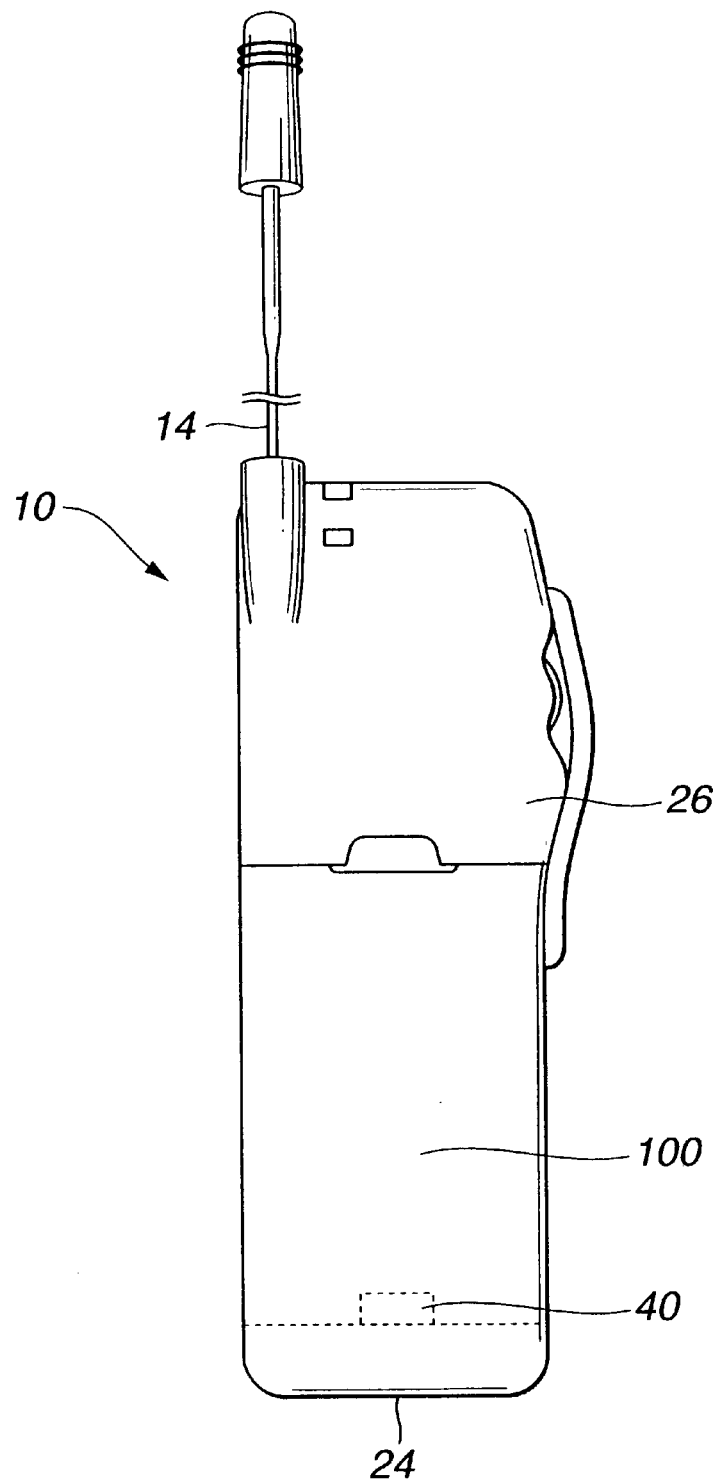
FIG. 4 is a rear view showing the portable telephone of FIG. 3.

FIGS. 3 and 4 show a portable telephone as an exemplary electronic equipment. In this example, one battery 100 is removably mounted on a portable telephone 10.

The portable telephone 10 has a casing 12, a single battery 100, a display part 16, an antenna 14, a speaker 22, a microphone 20, an operating part 18 and the like. The battery 100 is a battery for supplying a power source to the portable telephone 10.

Figure 1:
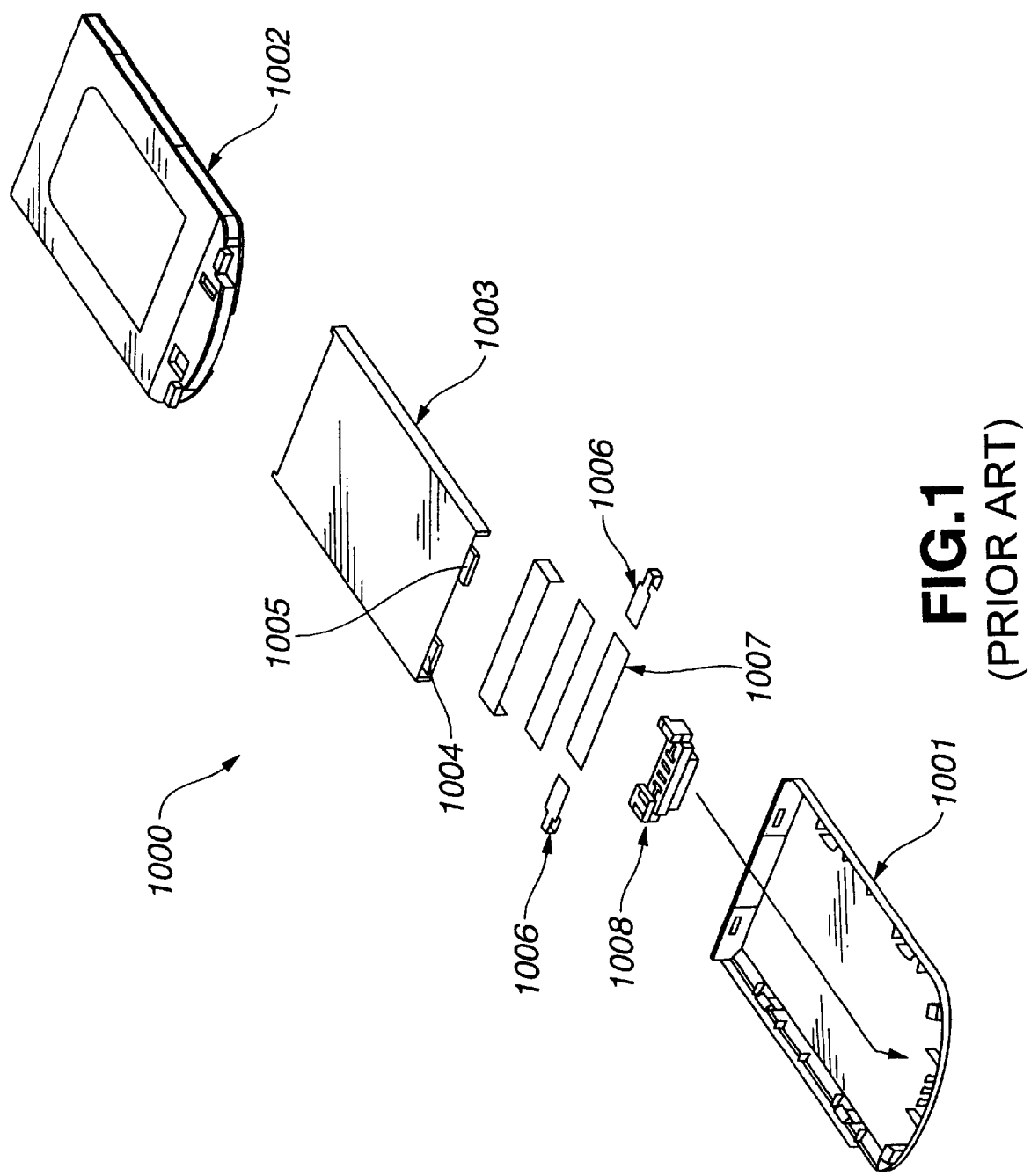
FIG. 1 shows an exemplary structure of a conventional battery.
Figure 2:
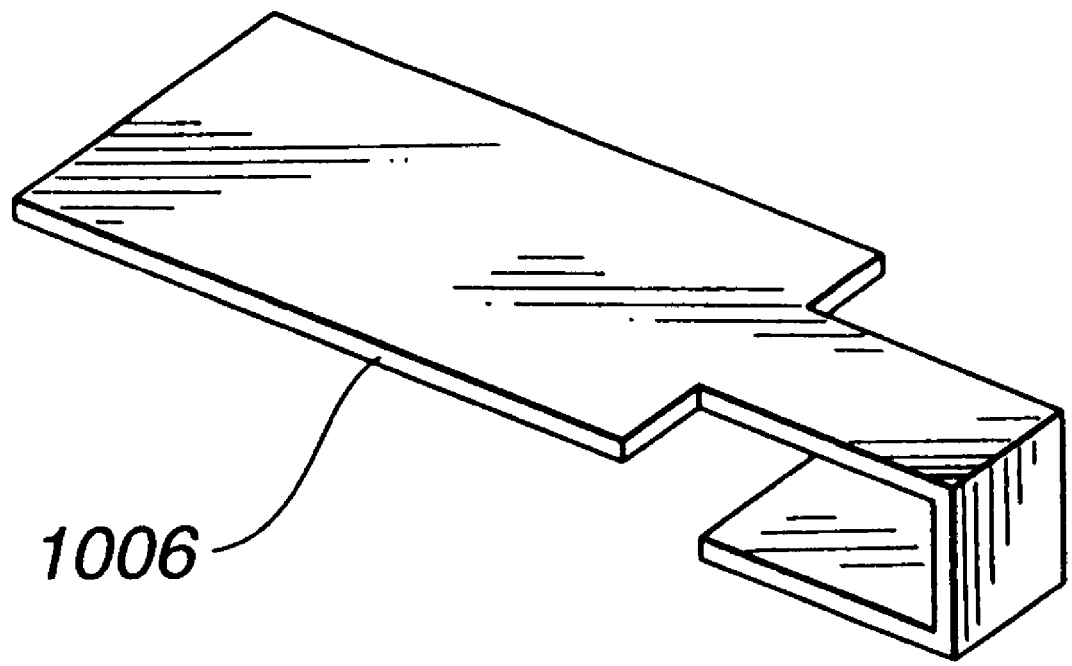
FIG. 2 shows a tab of the conventional battery of FIG. 1.

The casing 12 has a front part 24 and a rear part 26. As shown in FIG. 2, the battery 100 is removably mounted on the back side of the front part 24 below the rear part 26.

The display part 16 is a portion for display various information. For example, a liquid crystal display device can be used for the display part 16. The speaker 22 is for outputting sounds, and the microphone 20 is a portion for inputting the voice of the operator.

The operating part 18 has a ten-key pad 18C, a button 18A for making a phone call, a button 18B for hanging up, and so on.

Figure 5:
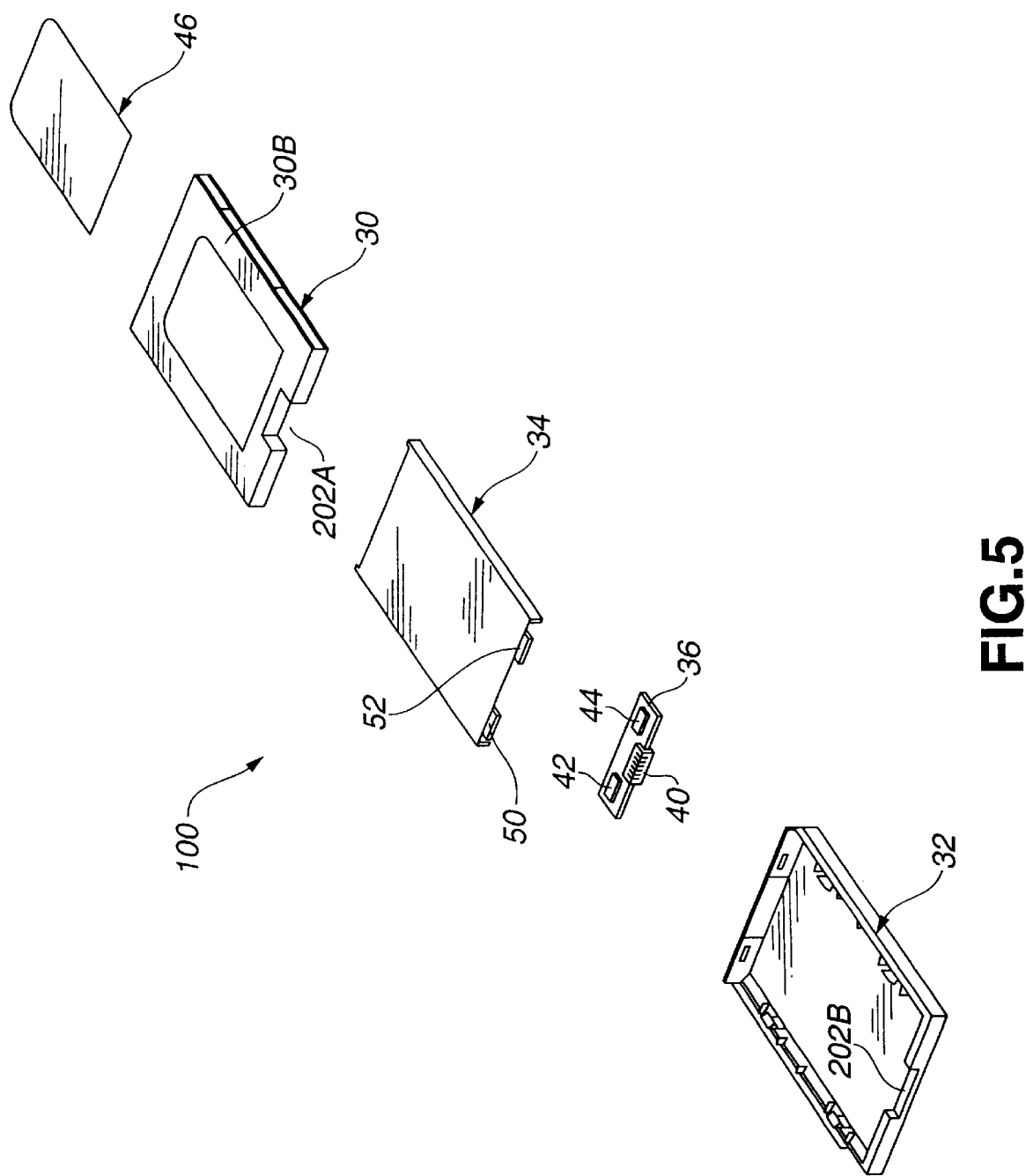
FIG. 5 is an exploded perspective view of a battery shown in FIG. 4.

FIG. 5 shows an exemplary structure of the battery 100 of FIG. 4.

The battery 100 of FIG. 5 schematically has an upper case 30, a lower case 32, a battery body 34, a board 36, an electric connecting part 40, compression-bonded terminals 42, 44, and a label 46.

Figure 6:
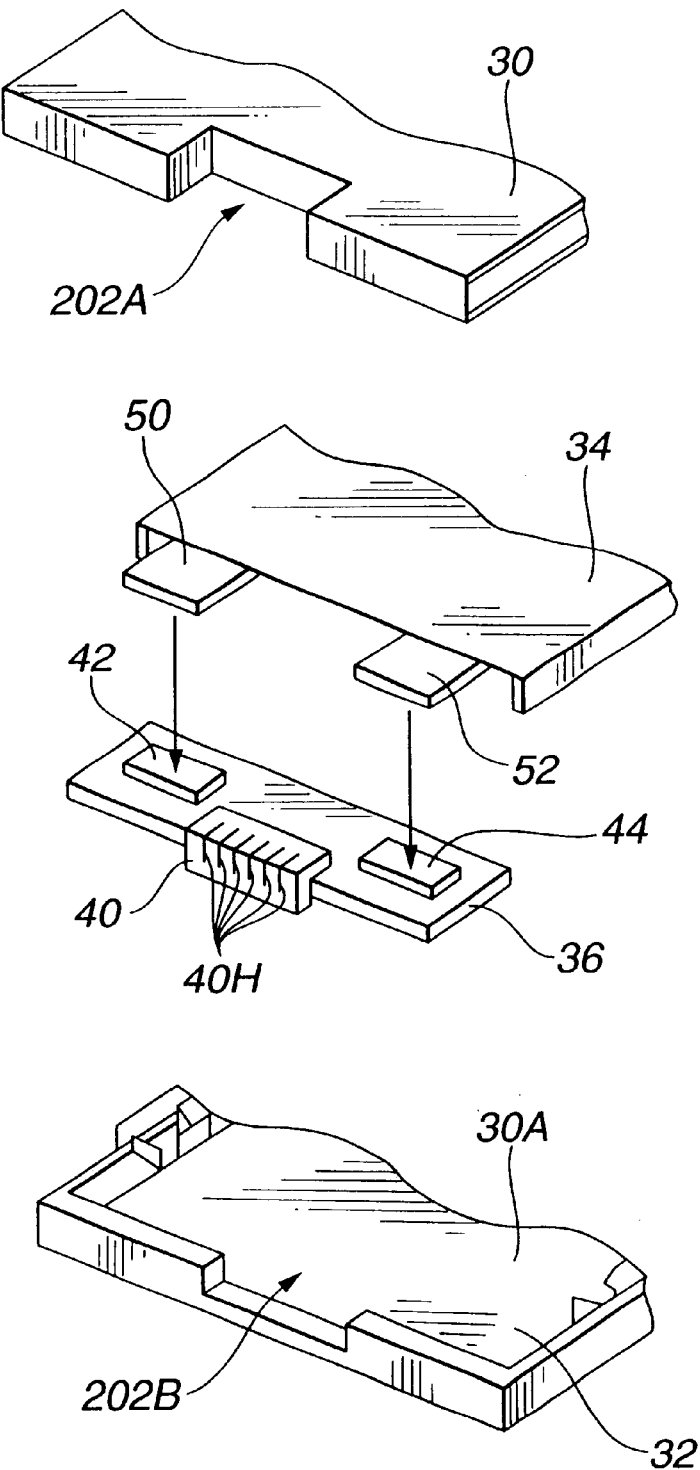
FIG. 6 is an enlarged view showing the battery of FIG. 5.

FIG. 6 shows an enlarged view of the structure of the upper case 30, the lower case 32, the battery body (also referred to as cell) 34, the board 36, the electric connecting part 40, and the compression-bonded terminals 42, 44.

The upper case 30 and the lower case 32 are containers for housing the battery body 34 and the board 36 and are made of a plastic resin material, for example, ABS (acrylonitrile butadiene styrene), PC (polycarbonate), PC/ABS (polycarbonate/acrylonitrile butadiene styrene), PBT (polybutylene terephthalate), PPS (polyphenylene sulfide), denatured PPE (polyphenylene ether) or the like.

The upper case 30 and the lower case 32 can be integrated with each other, for example, by ultrasonic welding. The label 46 shown in FIG. 5 is bonded onto the outer surface 30B of the upper case 30. The characteristics and other information about the battery 100 are described on the label 46.

Figure 7A:
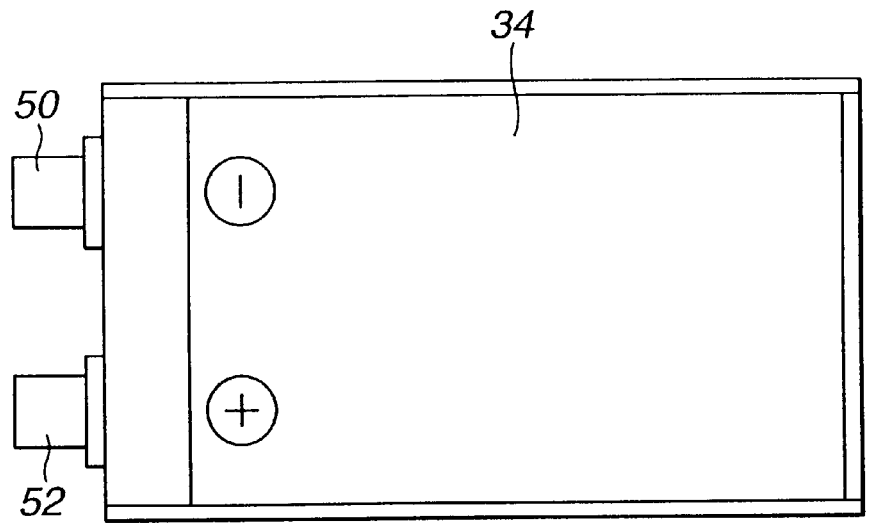
FIGS. 7A and 7B show a battery body.
Figure 7B:
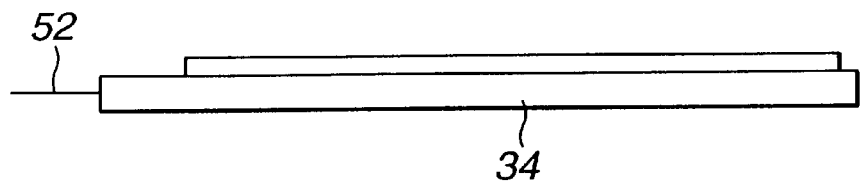

FIGS. 7A and 7B show an exemplary shape of the battery body 34.

The battery body 34 shown in FIGS. 7A and 7B has electrode lead-out parts 50, 52. The electrode lead-out part 50 is an anode, for example, made of nickel, and the other electrode lead-out part 52 is a cathode, for example, made of aluminum.

The battery body 34 is a battery which can be charged/discharged many times such as a lithium ion battery, a lithium polymer battery, or a solid polymer battery. The battery body 34 is sealed by a case.

The board 36 shown in FIGS. 5 and 6 is a board arranged between the upper case (also referred to as first case) 30 and the lower case (also referred to as second case) 32. The board 36 is, for example, rectangular, and has a protection circuit for protecting the battery body 34 and the compression-bonded terminals 42, 44.

The protection circuit of the board 36 enables prescription of an upper limit voltage in charging and prescription of a lower limit voltage in discharging, for safety.

The board 36 is made of, for example, a glass epoxy board, a paper phenol board, a flexible printed wiring board, a liquid crystal polymer board or a ceramic plate board.

To one end and the other end of the board 36 shown in FIGS. 5 and 6, the compression-bonded terminals 42, 44 are electrically joined by soldering, for example, through a reflow furnace. The compression-bonded terminals 42, 44 are made of a conductive metal material such as a steel plate, phosphor bronze plate or beryllium copper plate on which solder plating is performed, or a tinplate. The compression-bonded terminals 42, 44 are plate-like members as shown in FIG. 6.

The compression-bonded terminal 42 of FIG. 5 is situated at a position on the board 36 corresponding to the electrode lead-out part 50, and the compression-bonded terminal 44 is situated at a position on the board 36 corresponding to the electrode lead-out part 52. The compression-bonded terminals 42, 44 have the same compression bonding structure.

Figure 8:
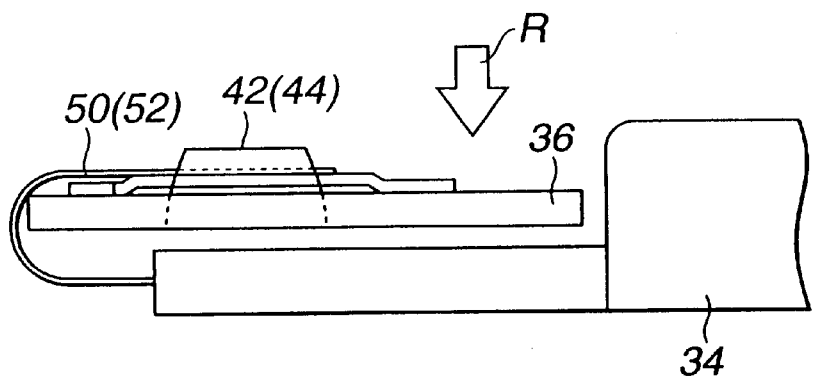
FIG. 8 shows an example in which the battery body is connected with a board.
Figure 9:
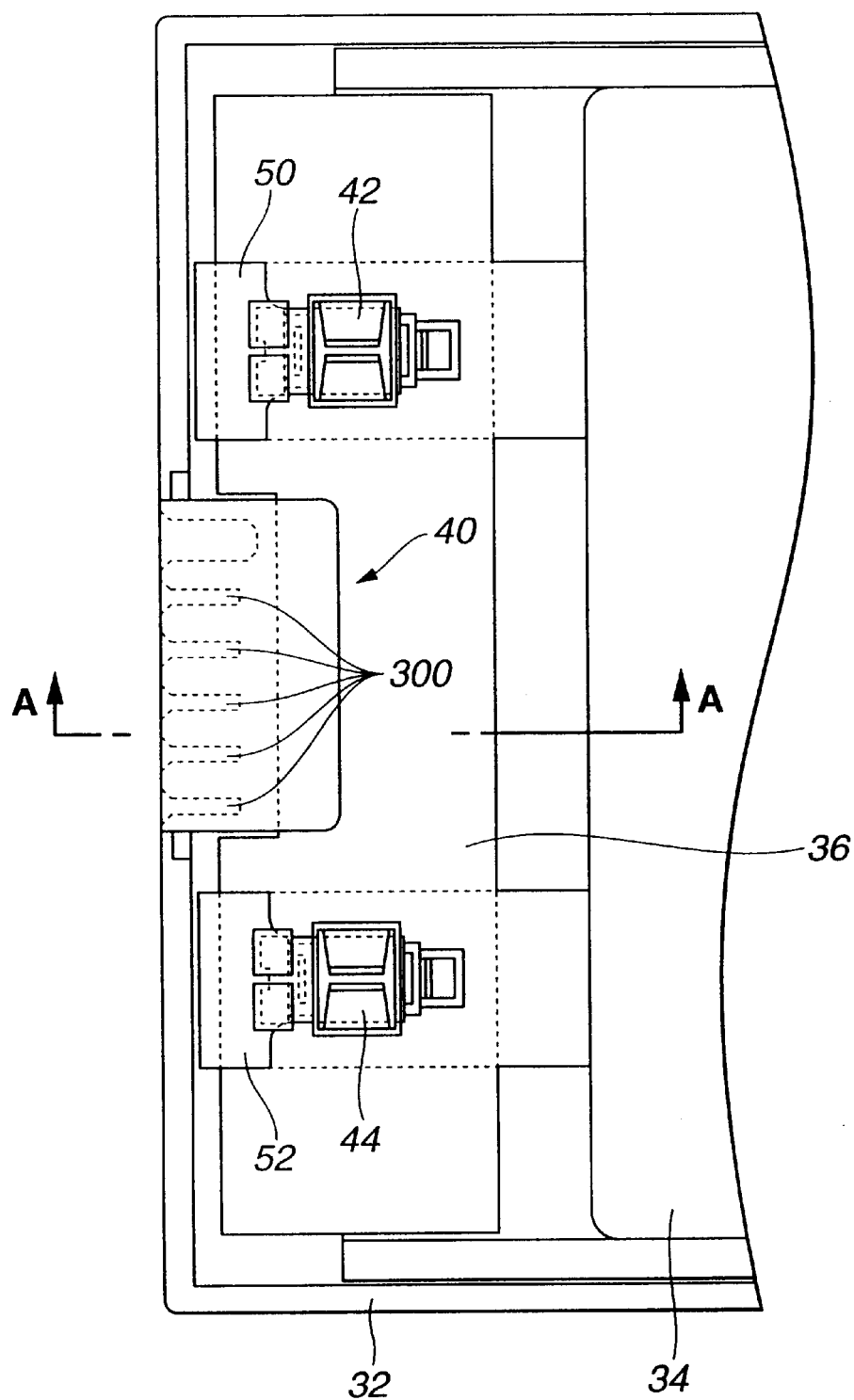
FIG. 9 is a plan view showing a board, an electric connecting part and the like arranged in a case.

As shown in FIGS. 8 and 9, the compression-bonded terminal 42 (or 44) is caulked by a caulking punch and thus integrally fixed to surround the corresponding electrode lead-out part 50 (or 52).

Thus, the electrode lead-out part 50 is connected to a predetermined position on the conductor pattern of the board 36 via the compression-bonded terminal 42, and the electrode lead-out part 52 is electrically connected to a predetermined position on the conductor pattern of the board 36 via the compression-bonded terminal 44.

In this manner, the electrode lead-out parts 50, 52 can be electrically connected to the board 36 easily by the mechanical caulking without heating, via the corresponding compression-bonded terminals 42, 44. That is, it is possible to avoid the damage to the battery body 34 due to the heat transferred to the battery body 34 by electrically connecting the electrode lead-out parts to the board by manual soldering.

Figure 10:
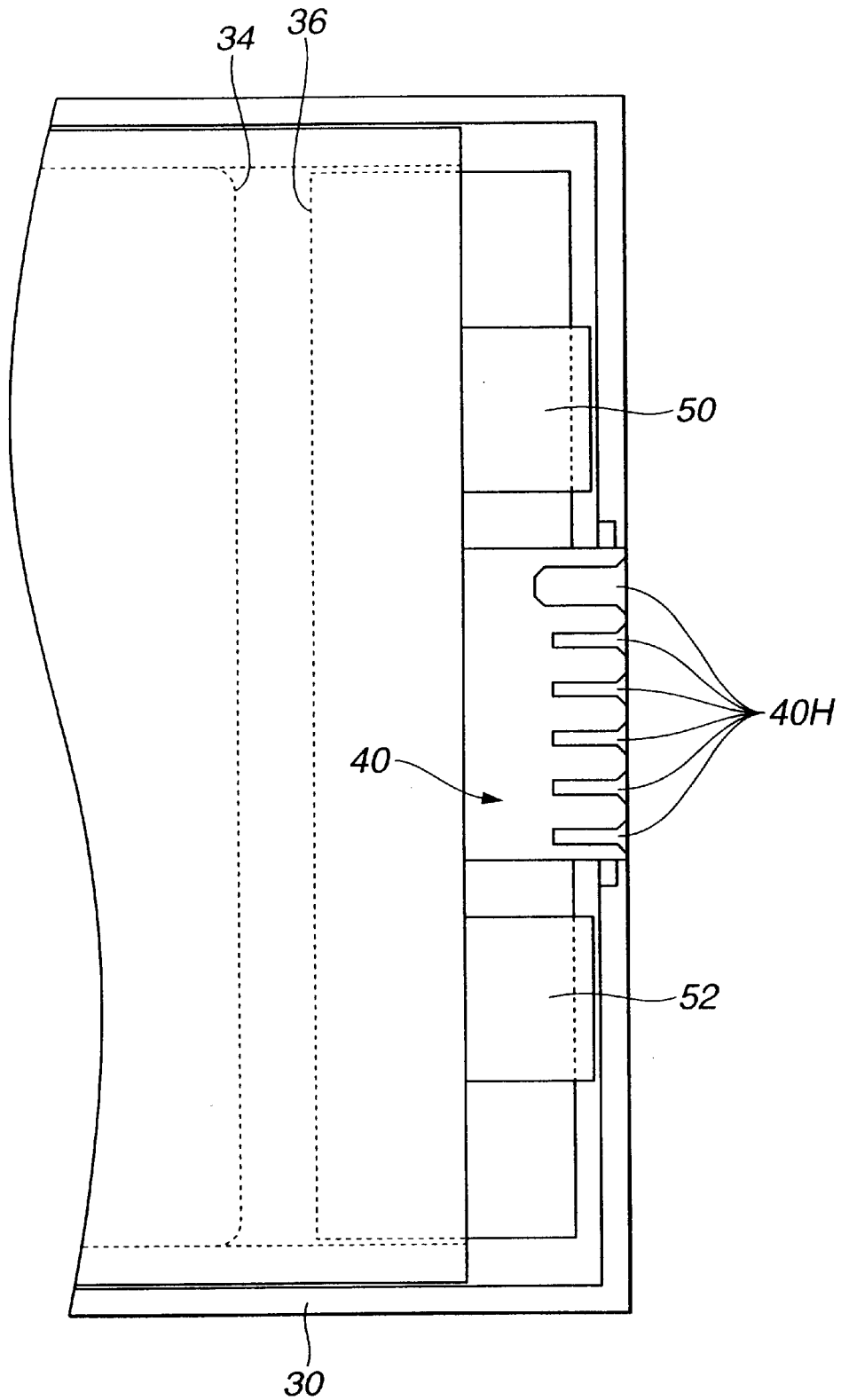
FIG. 10 is a rear view of FIG. 9.
Figure 11:
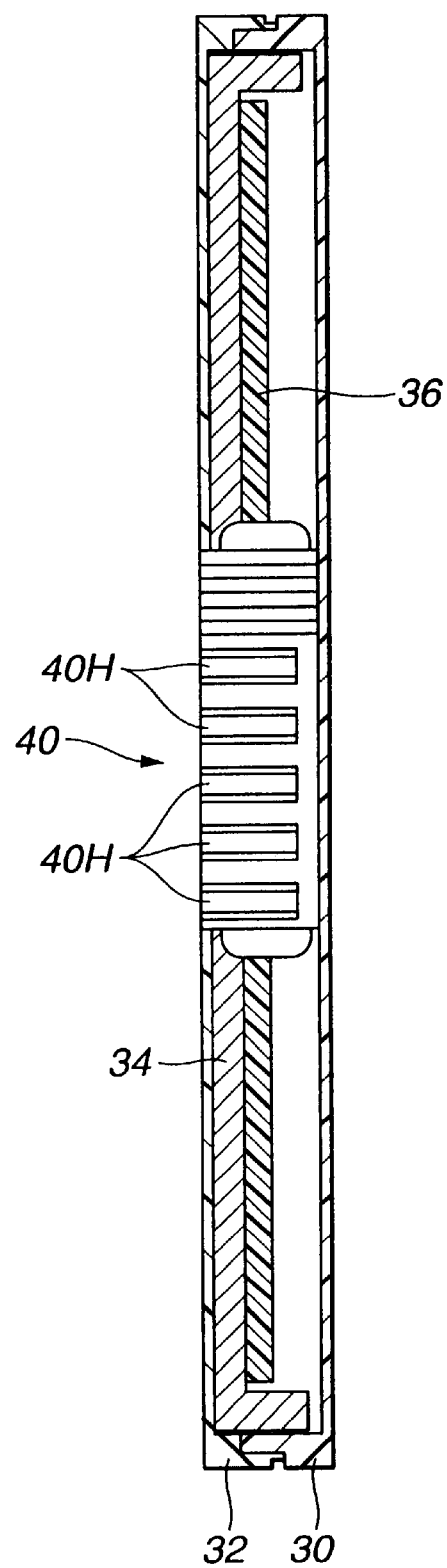
FIG. 11 is a cross-sectional view showing an upper case, a lower case and an electric connecting part.

FIG. 9 shows the board 36, the battery body (cell) 34, the electric connecting part 40 and the like. FIG. 10 is a rear view of FIG. 9. FIG. 11 shows the upper case 30, the lower case 32, the electric connecting part 40, the board 36, the battery body 34 and the like. The upper case 30 is also referred to as upper casing part and the lower case 32 is also referred to as lower casing part.

Figure 12:
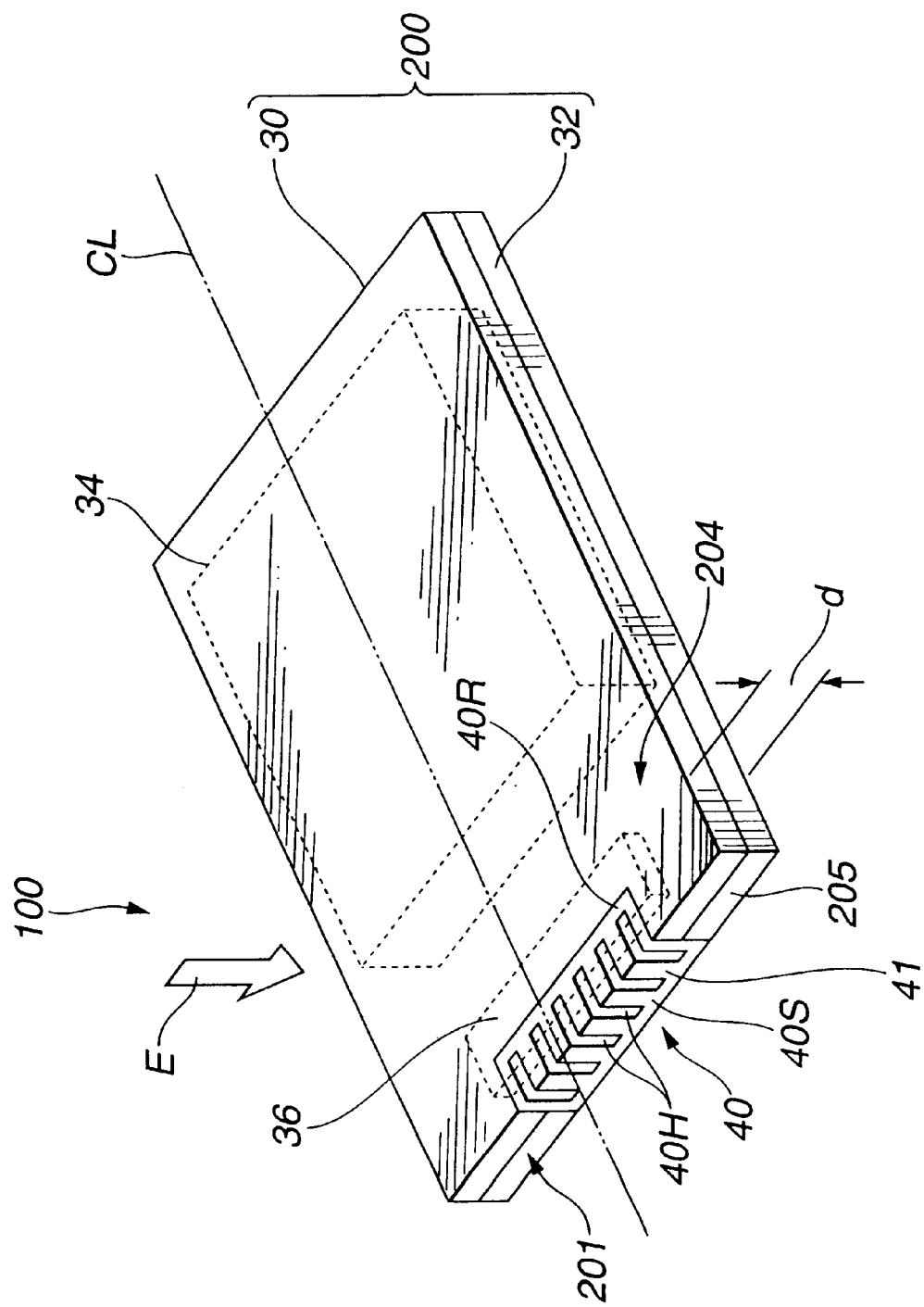
FIG. 12 is a perspective view showing the battery.

FIG. 12 shows the state in which the upper case 30, the lower case 32, the electric connecting part 40 and the like are assembled to complete the battery. The battery body 34 is housed in the upper case 30 and the lower case 32.

The upper case 30 and the lower case 32 constitute a case 200. In this case 200, the board 36 and the battery body 34 shown in FIGS. 5 and 6 are housed, as indicated by a broken line.

The case 200 is a flat member having a constant thickness d over the entire case 200. On one end part 201 of the case 200, the electric connecting part 40 is integrally arranged. The electric connecting part 40 is an electric connection device and is provided across a centerline CL along the longitudinal direction of the case 200 as the center.

The electric connecting part (electric connection device) 40 shown in FIG. 12 has a housing 41. A surface 40R and a surface 40S of the electric connecting part 40 are exposed to be flush with a surface 204 and another surface 205 of the case 200.

As shown in FIGS. 5 and 6, in the upper case 30, a housing part 202A is formed in which the housing 41 of the electric connecting part 40 is fitted and held. Also in the lower case 32, a housing part 202B is formed in which the housing 41 of the electric connecting part 40 is fitted and held.

Figure 13:
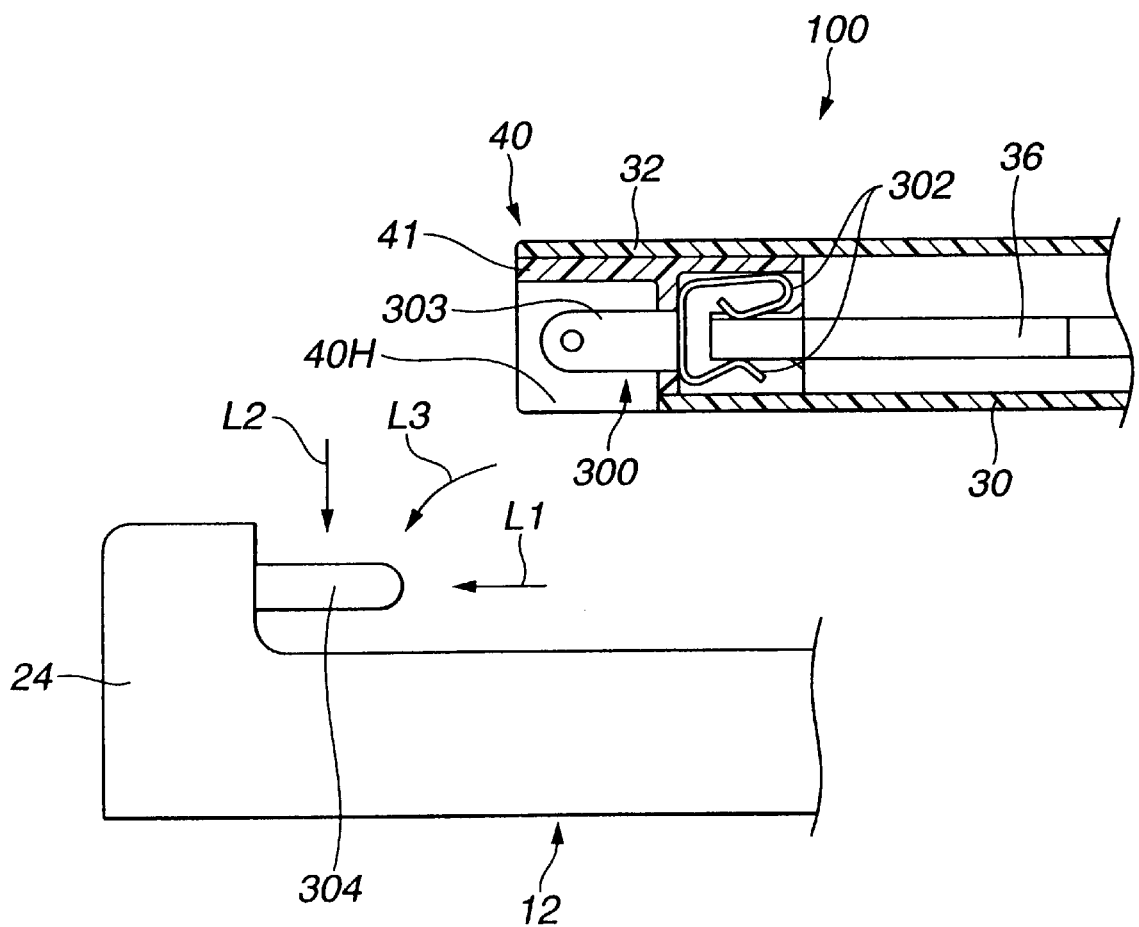
FIG. 13 shows an exemplary cross-sectional structure along a line A—A in FIG. 9.

FIG. 13 shows an exemplary cross-sectional structure along a line A—A in FIG. 9, and the front part 24 and the like of the portable telephone 10. As shown in FIG. 13, a connecting part 303 of a connection terminal 300 can be inserted in any one of an L1 direction, an L2 direction and an L3 direction for connection with a contact 304.

Figure 14:
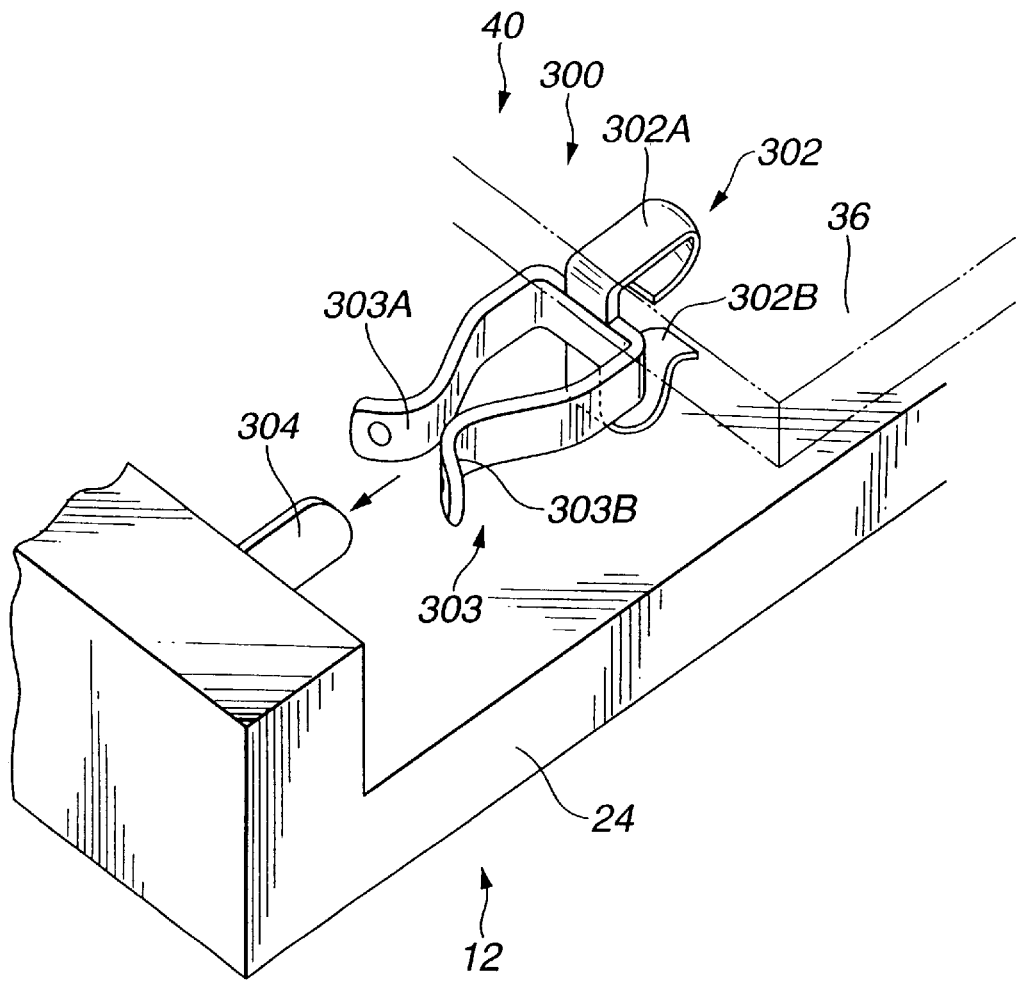
FIG. 14 is a perspective view showing a connection terminal of the electric connecting part and a contact of the portable telephone.
Figure 15A:
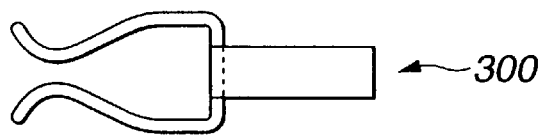
FIGS. 15A and 15B show the shape of the connection terminal.
Figure 15B:
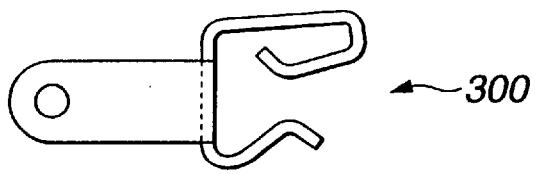
Figure 16D:
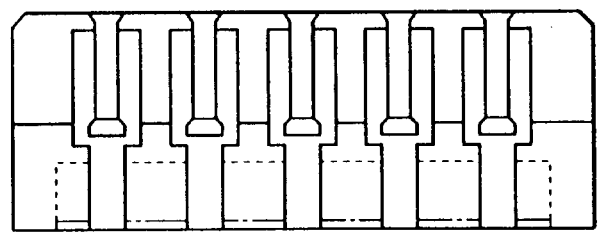
FIGS. 16A to 16D show the shape of the electric connecting part.
Figure 16C:
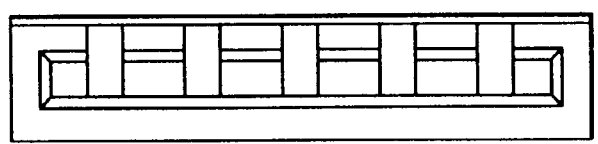
Figure 16B:
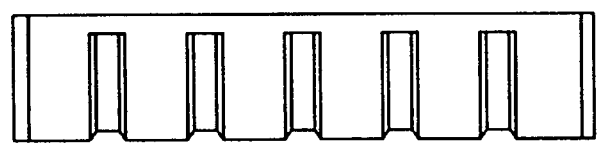
Figure 16A:
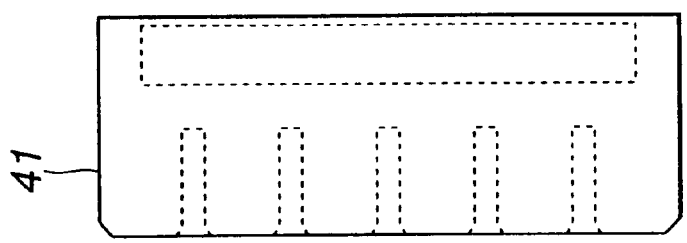

FIG. 14 shows the front part 24 of the casing 12, the board 36, the connection terminal 300 of the electric connecting part 40 and the like. FIGS. 15A and 15B show an exemplary shape of the connection terminal 300. FIGS. 16A to 16B show an exemplary shape of the electric connecting part 40.

The electric connecting part 40 has the housing and a plurality of connection terminals 300. The plurality of connection terminals 300 are arrayed at an equal spacing from one another, for example, as shown in FIG. 9. The connection terminal 300 has a connecting part 302 and another connecting part 303, as shown in FIGS. 13 and 14. The connecting part 302 can mechanically and elastically pinch and hold one surface and the other surface of the board 36 so as to electrically connect to the conductor pattern of the board 36. Thus, the connecting part 302 and the conductor pattern of the board 36 are electrically connected with each other.

The connecting part 303 of the connection terminal 300 shown in FIG. 14 is a part which can be removably connected to the contact 304 provided to protrude from the side of the front part 24 of the portable telephone. Similar to the connecting part 302 constituted by elastic members 302A and 302B, the connecting part 303 is constituted by an elastic member 303A and an elastic member 303B. The contact 304 is removably inserted between the elastic members 303A and 303B, and the contact 304 can be elastically pinched and held by the elastic members 303A and 303B. Thus, the contact 304 and the elastic members 303A and 303B of the connecting part 303 can be electrically and removably connected with each other.

Therefore, the contact 304 of the casing 12 and the board 36 of the battery can be electrically connected securely and easily via the connection terminals 300.

Figure 17A:
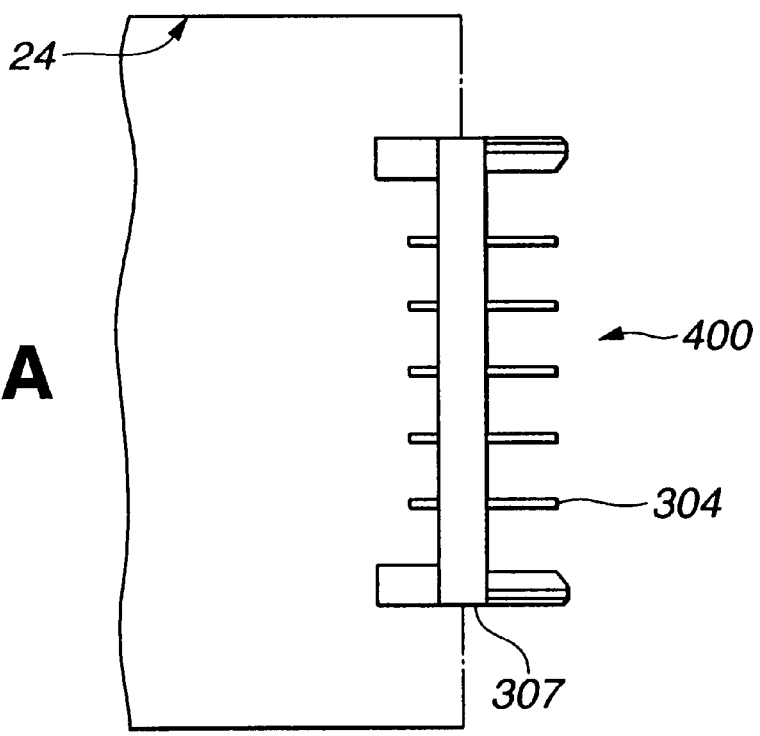
FIGS. 17A to 17D show an example of the contact of the electronic equipment.
Figure 17B:
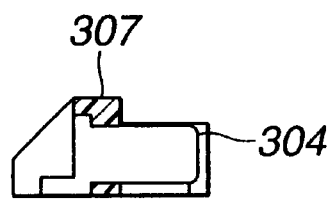
Figure 17C:
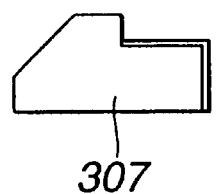
Figure 17D:
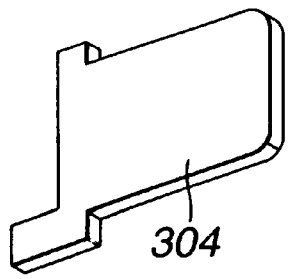

FIGS. 17A to 17D show an exemplary shape of the contact 304 shown in FIGS. 13 and 14. The contact 304 is formed to protrude parallel to a housing 307. Each contact 304 is a flat plate-like member as shown in FIG. 17D. The housing 307 supports the contact 304. The housing 307 is fixed on the side of the front part 24 of the casing 12.

The connection terminal 300 and the contact 304 shown in FIG. 14 are elastically deformable and are made of a highly conductive metal material such as SUS (stainless steel), copper, phosphor bronze, beryllium copper or the like.

The housing 41 of the connection terminal 300 shown in FIG. 13 and the housing 307 shown in FIGS. 17A to 17C are made of a highly insulating plastic material such as PPS (polyphenylene sulfide), LCP (liquid crystal polymer), PA (polyamide) or the like.

As shown in FIG. 12, the electric connecting part 40 is integrally arranged on the side of the one end part 201 of the case 200, and a plurality of apertures 40H are arrayed on the surface 40R and the surface 40S of the electric connecting part 40. The surface 40R is substantially flush with the surface 204 and the surface 40R is substantially flush with the surface 205. The respective apertures 40H are formed at positions corresponding to the connecting parts 3003 of the respective connection terminals 300 as shown in FIG. 13, and the contacts 304 on the front part 24 can be fit into the corresponding connecting parts 303 via the apertures 40H for connection.

Figure 18:
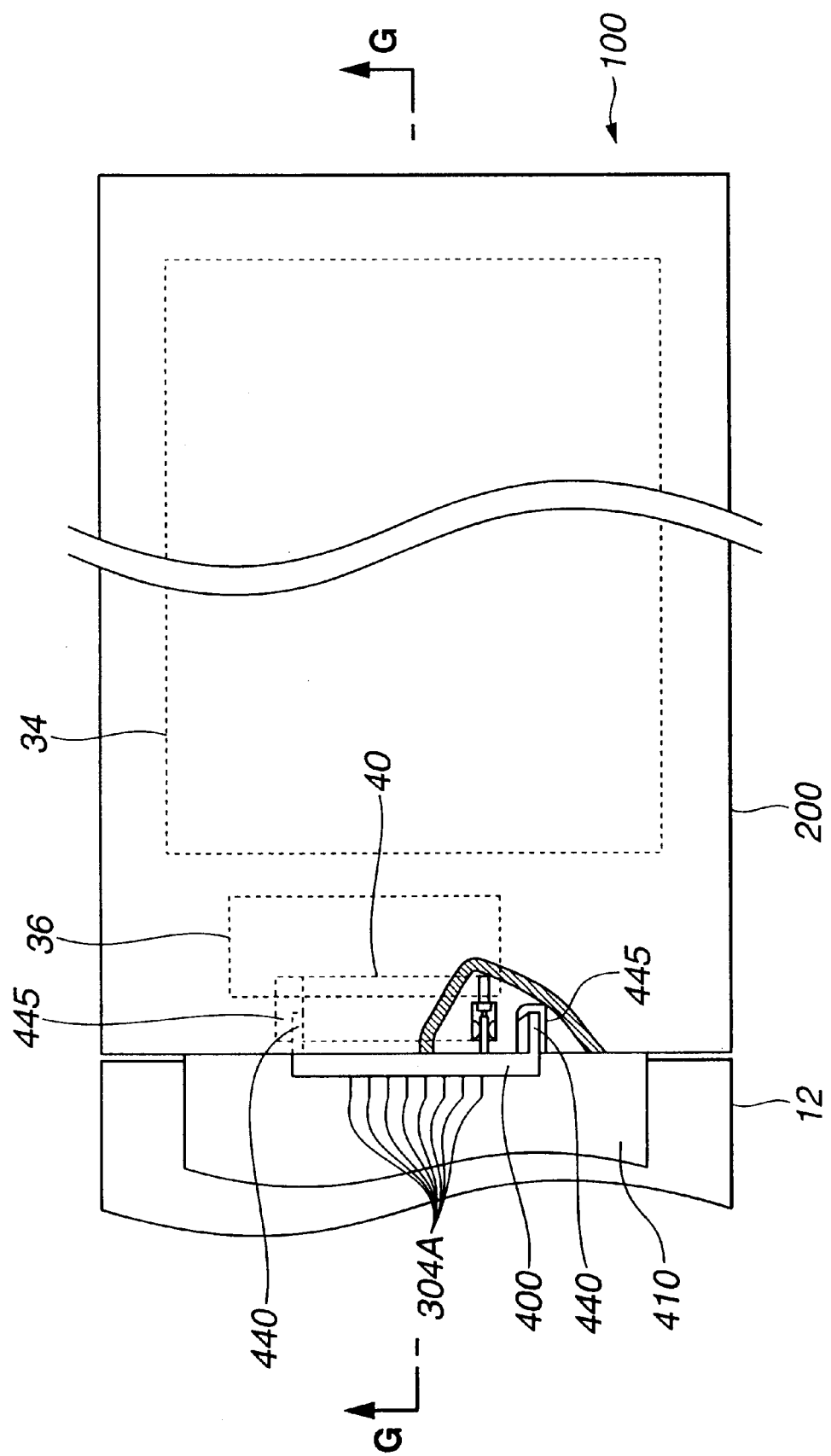
FIG. 18 is a plan view showing an example of connection between an electric connecting part of a battery case and a connector of a casing.
Figure 19:
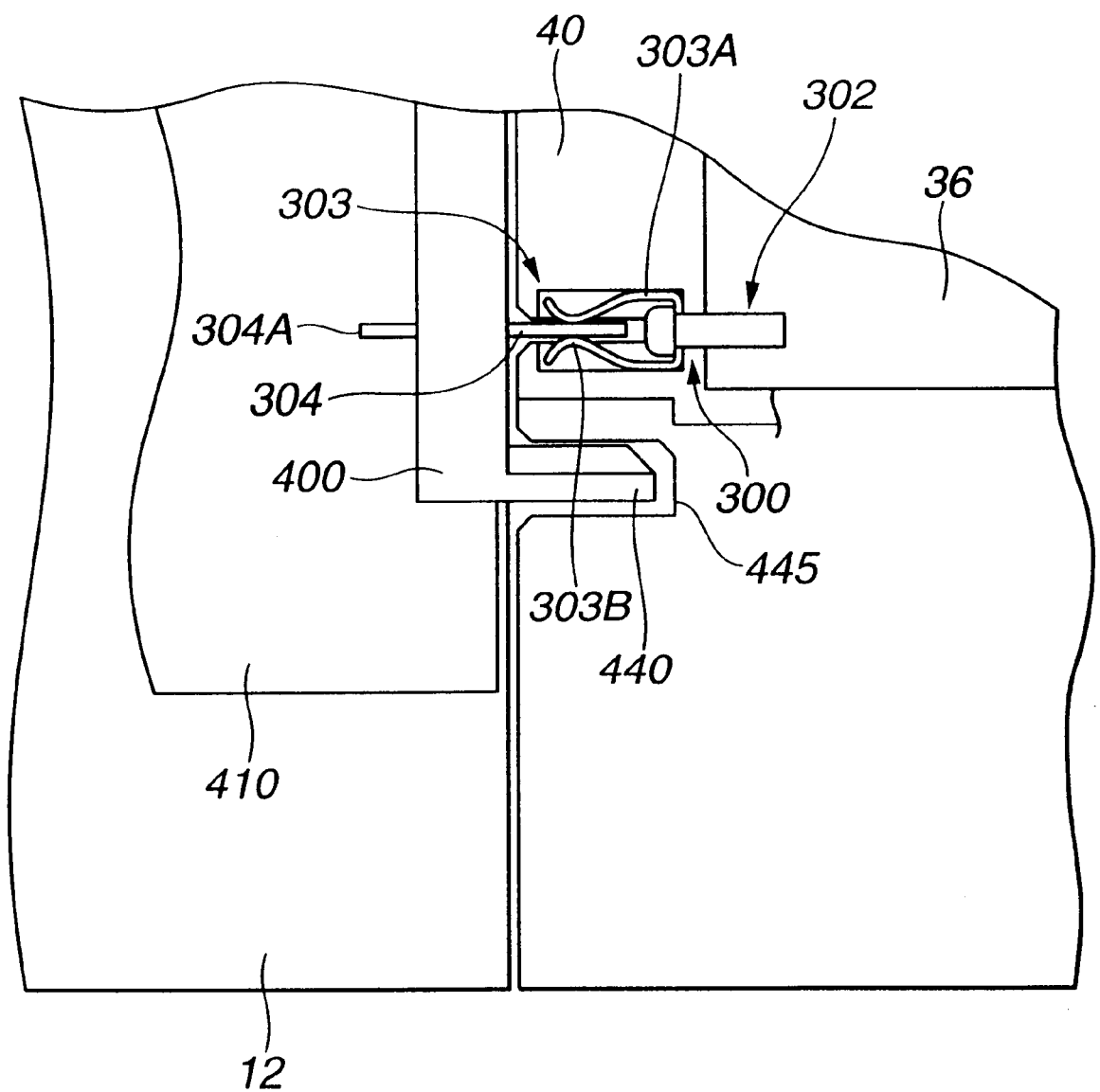
FIG. 19 is an enlarged view showing a part of FIG. 18.
Figure 20:
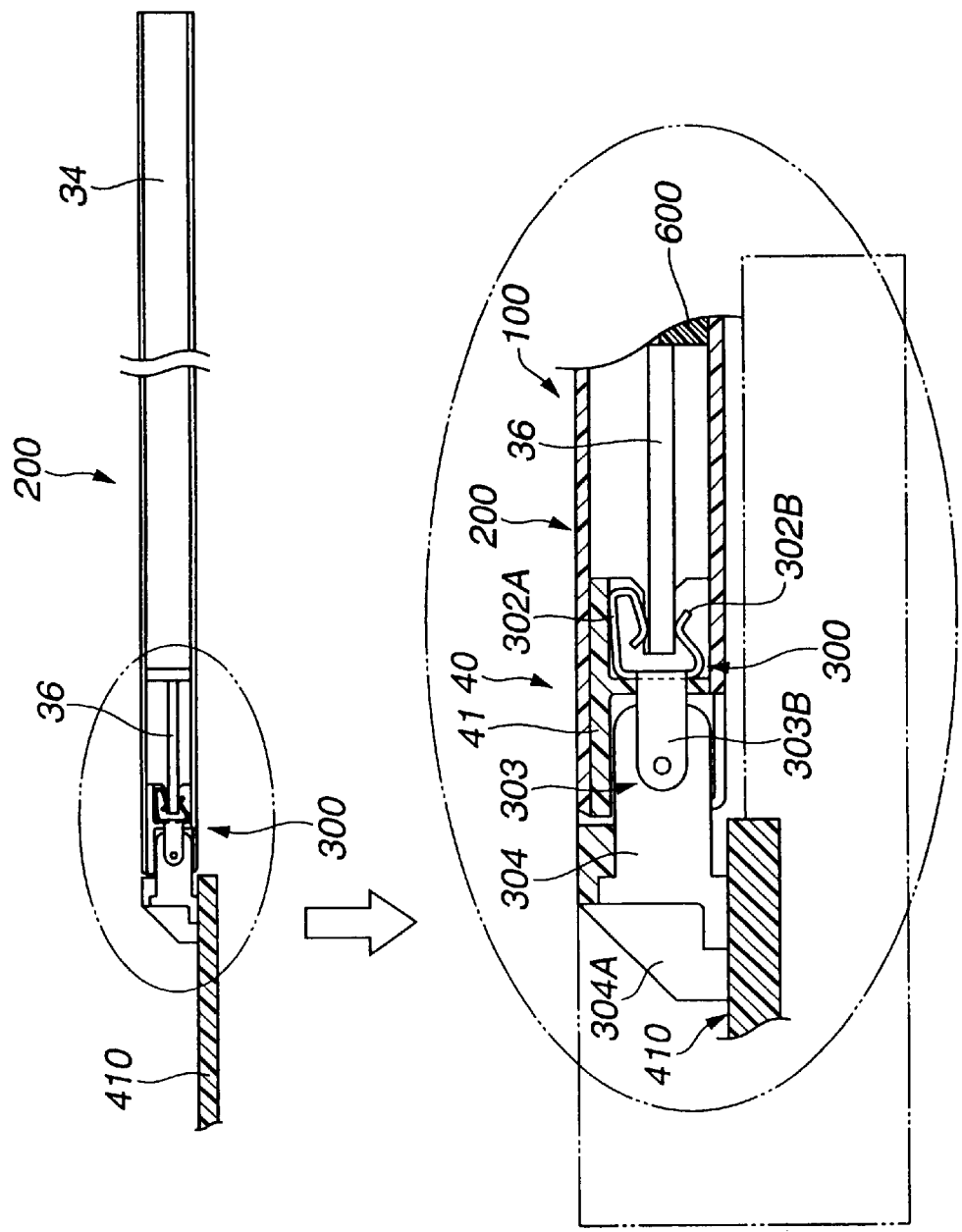
FIG. 20 is a cross-sectional view along a line G—G in FIG. 18.

FIG. 18 shows the case 200 and the board 36 of the battery 100, a part of the casing 12 of the portable telephone, the electric connecting part 40, a connector 400 and the like. FIG. 19 shows an enlarged view of a part of the board 36, the electric connecting part 40 and the connector 400 shown in FIG. 18. FIG. 20 shows an exemplary cross-sectional structure along a line G—G in FIG. 18.

In FIGS. 18 to 20, the connecting part 303 of the connection terminal 300 of the electric connecting part 40 electrically connects the plate-like contact 304 of the connector 400 by pinching and elastically holding the contact 304. An end part 304A of each contact 304 is electrically connected to a board 410 of the casing 12 of the portable telephone.

By using such an electric connecting part 40, the battery 100 can be attached to and removed from the casing 12, as conceptually shown in FIGS. 21A to 21C. In FIG. 21A, the battery 100 can be electrically connected and disconnected by rotating in the L3 direction in the form of one-side fulcrum.

In FIG. 21B, the battery 100 can be electrically connected and disconnected in the L2 direction, that is, up and down directions, with respect to the casing 12. In FIG. 21C, the battery 100 can be electrically connected and disconnected by moving in the L2 direction with respect to the casing 12 and sliding in the L1 direction.

Such forms of attaching/removing the battery 100 to/from the casing are already described with reference to FIG. 13.

FIGS. 22A to 22D show various examples of electric connection.

The connection form called a pin type (a kind of plug-in type) shown in FIG. 22A shows the electric connection form according to the embodiment of the present invention shown in FIGS. 18 to 20.

On the other hand, FIGS. 22B, 22C and 22D show example of the conventional electric connection, as comparative examples.

The connecting part 303 of the connection terminal 300 of the so-called pin type shown in FIG. 22A mechanically pinches and holds the contact 304 of the casing. Thus, the contact 304 and the connection terminal 300 can electrically and mechanically connected with each other securely and easily. Moreover, since the contact 304 and the connection terminal 300 can be self-cleaned with each other every time the contact 304 is inserted between the elastic members 303A and 303B, generation of rust and adherence of dust do not take place and high reliability of electric connection can be realized.

However, in a so-called non-pin type using one leaf spring 3000 as shown in FIG. 22B, since the leaf spring 3000 is simply in contact with a contact 3001, the electric connection of the leaf spring 3000 with the contact 3001 might be broken by vibration or the like.

In a so-called spring pin type in which a connecting part 4001 is pressed to a contact 4002 by a spring 4000 as shown in FIG. 22C, the electric connection is similarly insufficient. With a structure in which a leaf spring 500 is caused to contact a contact 5001 as shown in FIG. 22D, the electric connection is unreliable similarly to the case of FIG. 22B.

By employing the structure of the connection terminal 300 and the shape of the contact 304 of the connector 400 of the casing 12 according to the embodiment of the present invention, the following advantages are provided.

Since both of the connecting parts 303 and 302 of the connection terminal 300 are housed in the housing 41, for example, as shown in FIG. 20, the connection terminal 300 is not exposed outward at all and therefore an electric short circuit can be prevented.

Moreover, since the elastic members 303A, 303B of the connecting part 303 of the connection terminal 300 can be securely electrically connected by mechanically pinching and holding the contact 304, the reliability of electric connection can be significantly improved by so-called double contact.

The contact 304 can be inserted in the connecting part 303 and thus pinched and held by the connecting part 303. Therefore, the above-described reliability of electric contact can be improved and maintained.

Even if the case 200 of the battery 100 is somewhat deformed by heat or the like, the connecting part 303 can securely electrically connect the contact 304. Even if the contact 304 is moved by a dimensional change of the casing 12, the electric connection can be securely maintained by using the structure in which the contact 304 is pinched and held by the connecting part 303.

Since the contact 304 is pinched and held by the connecting part 303, reduction in electric conductor resistance value can be realized.

The connecting part 302 of the connection terminal 300 of FIG. 20 can electrically connecting to the board 36 of the battery 100 securely and easily by pinching the board 36. Therefore, energy saving can be realized in the assembly work for assembling the board 36 to the connection terminal 300.

Since the connecting part 302 contacts the board 36 by an elastic force and thus electrically connects to the board 36, soldering is not necessary and the connecting part 302 can simply extracted from the board 36 in the case of recycling. Since the connecting part 302 electrically contacts and connects to the board 36 on its two surfaces, the reliability of electric connection can be improved.

As shown in FIGS. 18 and 19, the connector 400 has guide pins 440, 400. These guide pins 440, 440 are guided and fit into guide holes 445 of the housing of the electric connecting part 40.

The connector 400 can be fit at an accurate position in the electric connecting part 40, and the contact 304 can be accurately inserted into the connecting part 303. Thus, the connection and insertion property for inserting and connecting the battery 100 to the casing 12 can be improved.

As shown in FIG. 20, the board 36 in the battery 100 is positioned in the case 200, for example, by a rib 600 of the case 200. That is, the board 36 can be securely positioned in the case 200 by using a part of the case 200.

Figure 23:
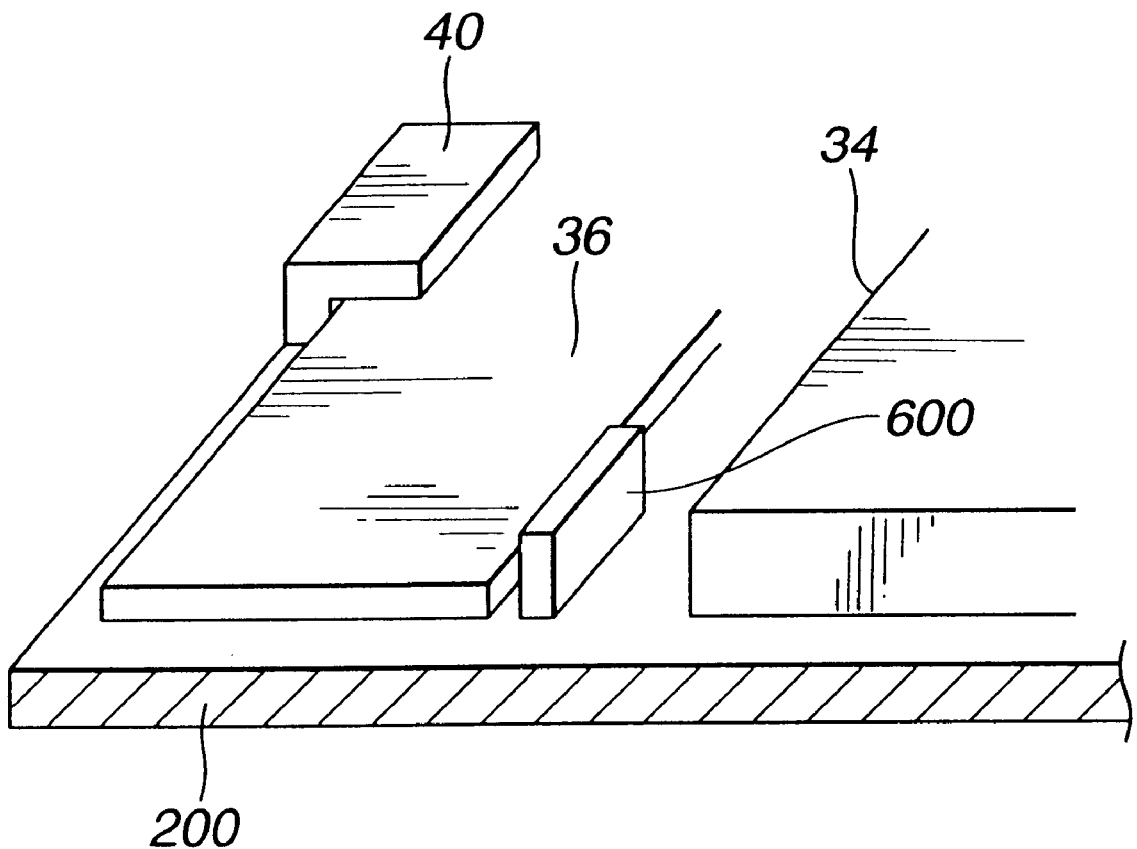
FIG. 23 shows an exemplary positioning structure for positioning the board within the case of the battery.

FIG. 23 shows an example in which the board 36 is positioned between the rib 600 of the case 200 and the electric connecting part 40. The board 36 can be easily assembled and positioned at an accurate position in the case 200.

FIGS. 24A to 24C, FIGS. 25A to 25C and FIGS. 26A to 26C show other embodiments in which the board 36 is positioned within the case 200 by using part of the case 200.

Figure 24A:
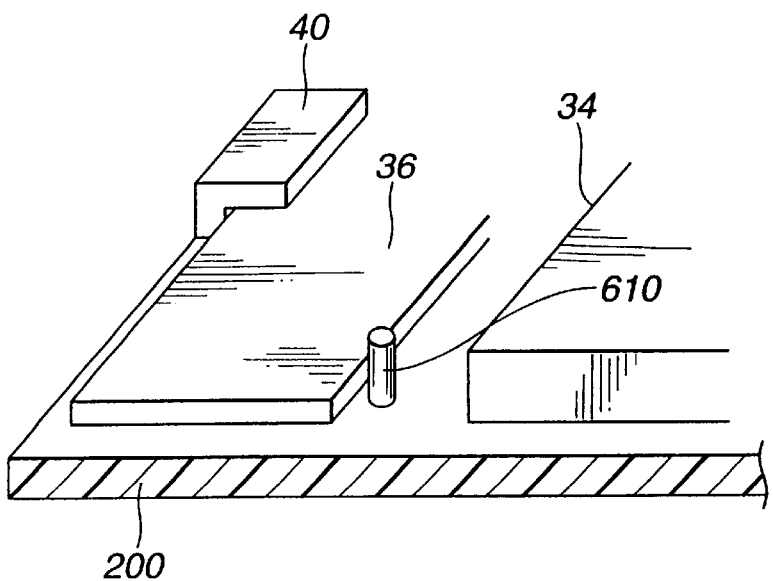
FIGS. 24A to 24C show exemplary positioning structures for positioning the board within the case of the battery.

In FIG. 24A, the board 36 is positioned and fixed by the electric connecting part 40 and a boss 610 on the case 200. While the rib 600 shown in FIG. 23 is a cubic rib, the boss 610 shown in FIG. 24A has, for example, a cylindrical shape.

Figure 24B:
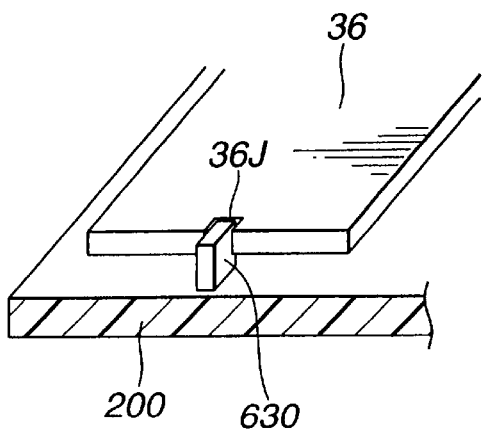

In FIG. 24B, the board 36 has a groove 36J. A cubic rib 630 is formed on the case 200 and this rib 630 is fitted in the groove 36J. The board 36 is thus positioned in the case 200.

Figure 24C:
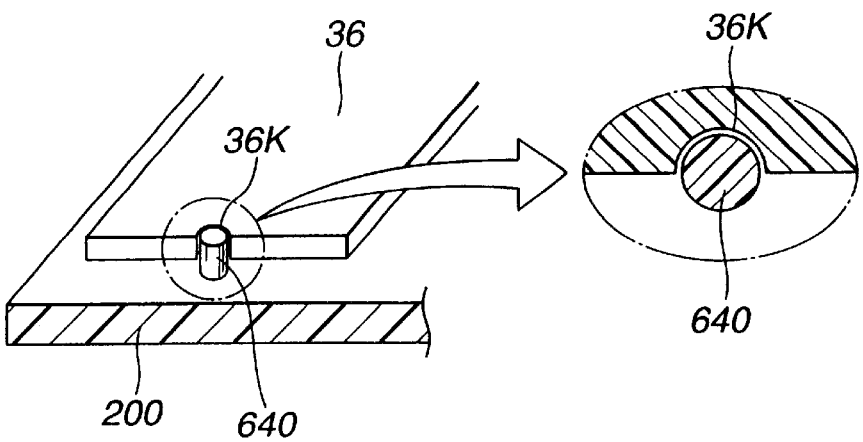

In FIG. 24C, a groove 36K of the board 36 is fitted with a cylindrical rib 640 on the case 200. The groove 36K of the board 36 is, for example, a semicircular groove.

Figure 25A:
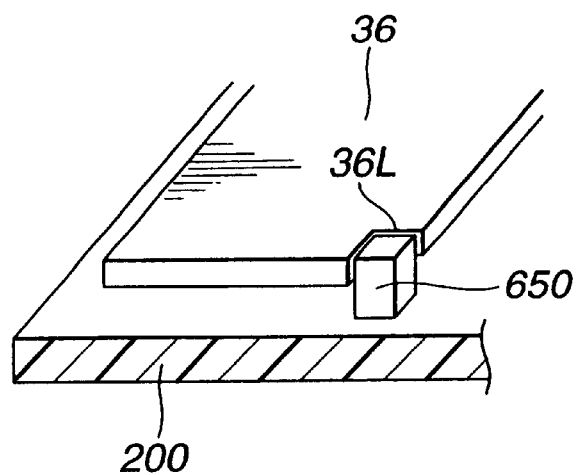
FIGS. 25A to 25C show exemplary positioning structures for positioning the board within the case of the battery.
Figure 25B:
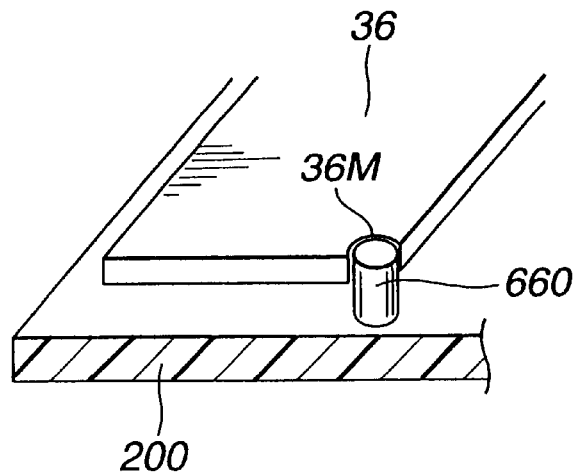

In FIG. 25A, a groove 36L is formed at a corner of the board 36. A cubic rib 650 on the case 200 is fitted in the groove 36L. In FIG. 25B, a groove 36M at a corner of the board 36 is fitted with a cylindrical rib 660 on the case 200.

Figure 25C:
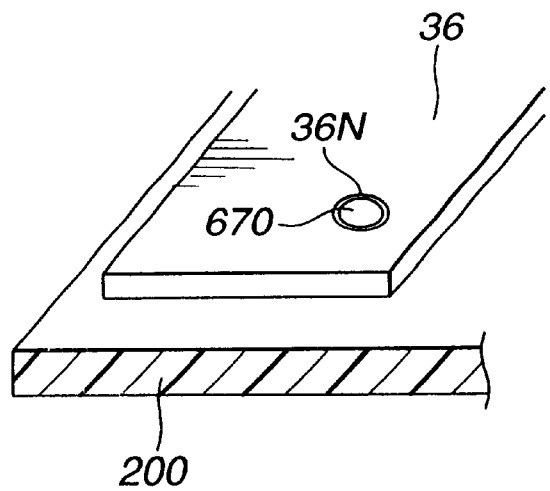

In FIG. 25C, a hole 36N is formed at a part of the board 36 and a cylindrical rib 670 on the case 200 is fitted in the hole 36N.

Figure 26A:
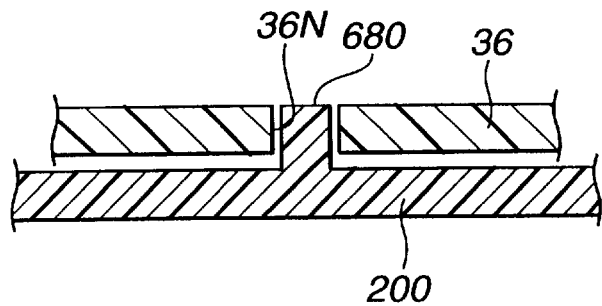
FIGS. 26A to 26C show exemplary positioning structures for positioning the board within the case of the battery.
Figure 26B:
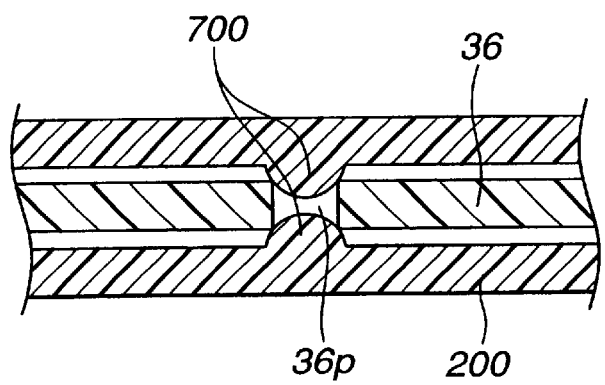

In FIG. 26A, a prismatic or cylindrical boss 680 is fitted in a hole 36N of the board 36. In FIG. 26B, two protrusions 700 on the case 200 are fitted in a hole 36P of the board 36.

Figure 26C:
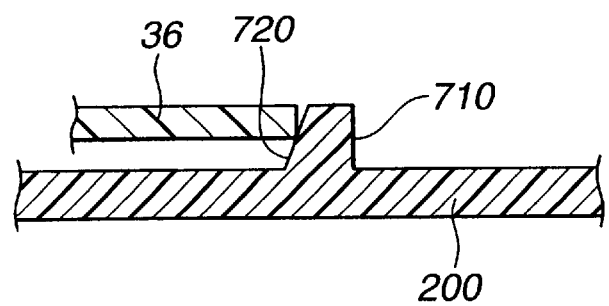

In FIG. 26C, an end surface of the board 36 is abutted against a tapered surface 720 of a boss 710 on the case 200.

The above-described bosses can be formed to protrude from the inner surface of any of the upper case and the lower case of the case 200.

Figure 27:
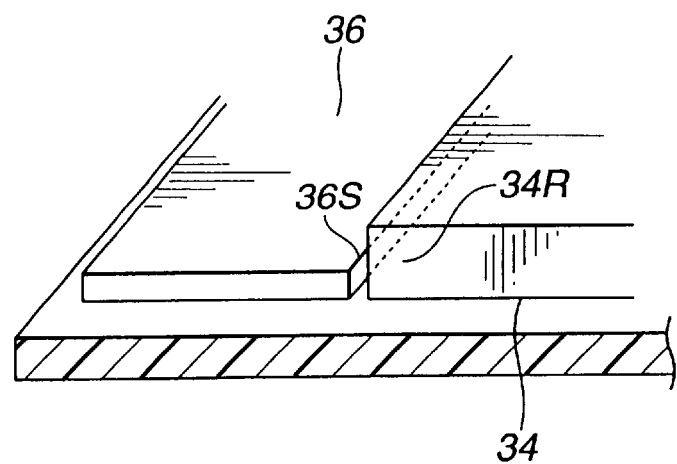
FIG. 27 shows an exemplary positioning structure for positioning the board within the case of the battery.

FIG. 27 shows another positioning form of the board 36 in the present invention. An end surface 36S of the board 36 is abutted against an end part 34R of the battery body 34, thus positioning the board 36.

Figure 28A:
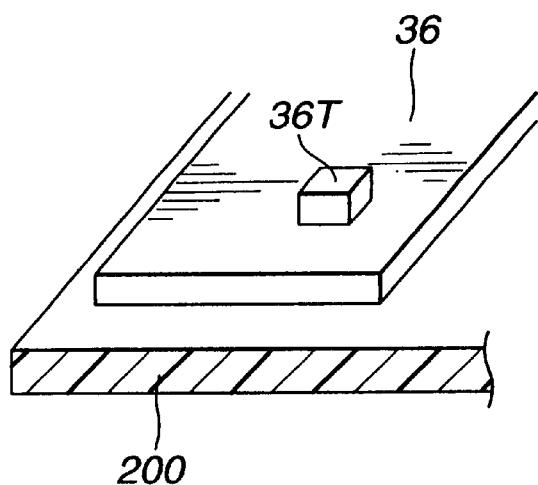
FIGS. 28A and 28B show an exemplary positioning structure for positioning the board within the case of the battery.
Figure 28B:
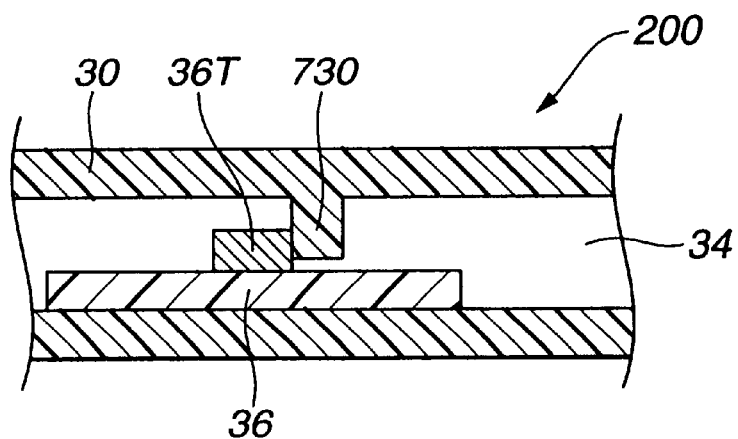

In FIGS. 28A and 28B, a protrusion 36T is provided like an electronic part mounted on the board 36. By abutting the protrusion 36T against a rib 730 on the upper case 30 of the case 200, as shown in FIG. 28B, the board 36 is positioned.

Figure 29:
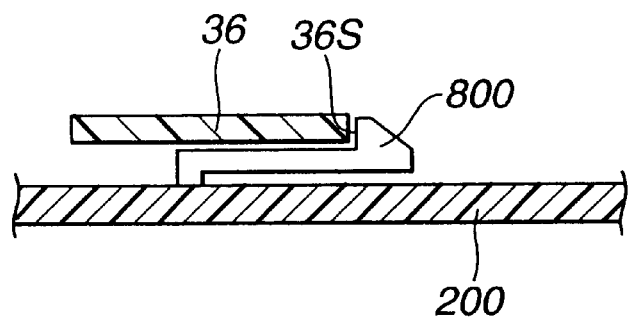
FIG. 29 shows an exemplary positioning structure for positioning the board within the case of the battery.

In FIG. 29, the end surface 36S of the board 36 is positioned by a pawl 800 on the case 200. The pawl 800 has a spring property.

With the plug-in type structure in which the contact 304 of the connector on the casing 12 of the electronic equipment is so-called plugged into the connection terminal 300 of the battery 100 for electric connection, the following advantages are provided.

The electric contact resistance between the connecting part 303 of the connection terminal 300 and the contact 304 is stabilized and the conductor resistance is reduced. When the battery is removed, the elastic members 303A, 303B of the connecting part 303 and the contact 304 rub against each other, thus enabling self-cleaning with each other. The connecting part 303 and the contact 304 can be securely electrically connected with each other.

Since the electric connection of the contact 304 with the connection terminal 300 is maintained even if the position of the contact 304 is somewhat shifted, the preventive measure for shutdown of electric connection can be realized.

Moreover, the electric contact pressure between the contact 304 and the connection terminal 300 can be stabilized. Since the part where the contact 304 electrically contacts the connection terminal 300 is situated within the housing 41 and does not appear on the outside, any external electric contact can be prevented and the appearance is improved.

In the electric connecting part 40, which is the electric connection device, the housing 41 and the connection terminal 300 are integrated with each other. Therefore, miniaturization and reduction in thickness of the device, and reduction in manufacturing cost are realized.

The present invention is not limited the above-described embodiments.

The electronic equipment of the present invention is not limited to a portable telephone and may also include a portable computer, a portable game machine, a digital still camera, a video camera, a personal information terminal and the like.

As is described above, according to the present invention, miniaturization and reduction in thickness of the device, improvement in reliability of electric connection, and reduction in cost can be realized.

What is claimed is:

1. An electrical connector assembly, comprising:
   (a) a connector board having a top surface, a bottom surface, and a front face;
   (b) a connector having a first U-shaped end and a second U-shaped end, the first U-shaped end being adapted to receive the connector board when the connector board is inserted between the legs of the U-shape;
   (c) an L-shaped connector disposed on the connector board so that a top leg of the L-shaped connector is disposed on the connector board top surface and a front leg of the L-shaped connector is disposed on the connector board front face, the L-shaped connector further having at least one aperture extending therethrough;
   (d) the second U-shaped end is aligned with the at least one aperture of the L-shaped connector;
   (e) wherein the assembly is configured to create an electrical connection between the connector board to the first U-shaped end of the connector to the second U-shaped end of the connector;
   (f) wherein one leg of the first U-shaped end is sandwiched between the connector board top surface and the top leg of the L-shaped connector; and
   (g) a telephone contact piece inserted into the second U-shaped end through the aperture of the L-shaped connector.

2. The connector assembly of claim 1, wherein connector board comprises at least one terminal disposed on the connector board top surface.

3. The connector assembly of claim 1, wherein the plane between the legs of the first U-shaped end is perpendicular to the plane between the legs of the second U-shaped end.

4. The connector assembly of claim 1, wherein the connector board is connected to a battery.

5. The connector assembly of claim 4, wherein at least one terminal disposed on the connector board top surface is connected to the battery.

6. The connector assembly of claim 4, wherein the battery comprises an electrode in electrical contact with at least one terminal disposed on the connector board top surface.

7. The connector assembly of claim 1, wherein the housing comprises a portable telephone.

8. The connector assembly of claim 7, wherein the connector board is connected to a battery.

9. An electrical connector assembly, comprising:
   (a) a connector board having a top surface, a bottom surface, and a front face;
   (b) a connector having a first U-shaped end and a second U-shaped end, the first U-shaped end being adapted to receive the connector board when the connector board is inserted between the legs of the U-shape;
   (c) an L-shaped connector disposed on the connector board so that a top leg of the L-shaped connector is disposed on the connector board top surface and a front leg of the L-shaped connector is disposed on the connector board front face, the L-shaped connector further having at least one aperture extending therethrough;
   (d) the second U-shaped end is aligned with the at least one aperture of the L-shaped connector;
   (e) wherein the assembly is configured to create an electrical connection between the connector board to the first U-shaped end of the connector to the second U-shaped end of the connector;
   (f) wherein one leg of the first U-shaped end is sandwiched between the connector board top surface and the top leg of the L-shaped connector;
   (g) wherein the plane between the legs of the first U-shaped end is perpendicular to the plane between the legs of the second U-shaped end;
   (h) wherein the connector board is connected to a battery;
   (i) wherein at least one terminal disposed on the connector board top surface is connected to the battery; and
   (j) a telephone contact piece inserted into the second U-shaped end through the aperture of the L-shaped connector.

10. The connector assembly of claim 9, wherein the second U-shaped end extends through the at least one aperture of the L-shaped connector.

11. The connector assembly of claim 9, wherein the connector board comprises two terminals disposed on the connector board top surface and the L-shaped connector is disposed between the two terminals.

12. The connector assembly of claim 11, wherein the battery includes two electrodes, where one electrode is disposed over one terminal and the other electrode is disposed over the other terminal.

13. An electrical connector assembly, comprising:
   (a) a connector board having a top surface, a bottom surface, and a front face;
   (b) a connector having a first U-shaped end and a second U-shaped end, the first U-shaped end being adapted to receive the connector board when the connector board is inserted between the legs of the U-shape;
   (c) an L-shaped connector disposed on the connector board so that a top leg of the L-shaped connector is disposed on the connector board top surface and a front leg of the L-shaped connector is disposed on the connector board front face, the L-shaped connector further having at least one aperture extending therethrough;
   (d) the second U-shaped end is aligned with the at least one aperture of the L-shaped connector;
   (e) wherein the assembly is configured to create an electrical connection between the connector board to the first U-shaped end of the connector to the second U-shaped end of the connector;
   (f) wherein one leg of the first U-shaped end is sandwiched between the connector board top surface and the top leg of the L-shaped connector;
   (g) wherein the plane between the legs of the first U-shaped end is perpendicular to the plane between the legs of the second U-shaped end;
   (h) wherein the connector board is connected to a battery;
   (i) wherein at least one terminal disposed on the connector board top surface is connected to the battery;
   (j) wherein the second U-shaped end extends through the at least one aperture of the L-shaped connector;
   (k) wherein the connector board comprises two terminals disposed on the connector board top surface and the L-shaped connector is disposed between the two terminals;
   (l) wherein the battery includes two electrodes, where one electrode is disposed over one terminal and the other electrode is disposed over the other terminal; and
   (m) a telephone contact piece inserted into the second U-shaped end through the aperture of the L-shaped connector.

* * * * *